(12) United States Patent
Nguyen et al.

(10) Patent No.: US 9,918,193 B1
(45) Date of Patent: Mar. 13, 2018

(54) HYBRID ELECTRONIC NAVIGATION AND INVITATION SYSTEM

(71) Applicant: HiaMaps Incorporated, New York, NY (US)

(72) Inventors: Long Duc Nguyen, Brooklyn, NY (US); Allan M. Greenspan, Philadelphia, PA (US); Allan Lee, Queens, NY (US)

(73) Assignee: HiaLabs Inc., New York, NY (US)

( * ) Notice: Subject to any disclaimer, the term of this patent is extended or adjusted under 35 U.S.C. 154(b) by 0 days.

(21) Appl. No.: 15/079,971

(22) Filed: Mar. 24, 2016

Related U.S. Application Data

(60) Provisional application No. 62/242,045, filed on Oct. 15, 2015.

(51) Int. Cl.
*H04W 4/02* (2009.01)
*H04L 12/58* (2006.01)
*G06F 3/0484* (2013.01)
*G06F 3/0488* (2013.01)

(52) U.S. Cl.
CPC ........ *H04W 4/023* (2013.01); *G06F 3/04842* (2013.01); *G06F 3/04883* (2013.01); *H04L 51/32* (2013.01)

(58) Field of Classification Search
CPC .... G06Q 50/01; G06Q 30/0205; G06Q 10/02; G06Q 30/0261; G06Q 30/0269; G06Q 30/0267; G06Q 30/0282; G06Q 10/1095; G06Q 30/0256; G06Q 10/06314; H04L 51/20; H04W 4/023; H04W 4/02; H04W 4/025
See application file for complete search history.

(56) References Cited

U.S. PATENT DOCUMENTS

| | | | |
|---|---|---|---|
| 8,065,171 B2 | 11/2011 | Nguyen et al. | |
| 8,862,103 B2 | 10/2014 | Xiao et al. | |
| 2007/0060108 A1 | 3/2007 | East et al. | |
| 2009/0036148 A1 | 2/2009 | Yach | |
| 2013/0024506 A1* | 1/2013 | Setton | G06Q 50/01 709/204 |
| 2013/0084833 A1* | 4/2013 | Xiao | H04W 4/185 455/414.1 |

(Continued)

*Primary Examiner* — Christopher M Brandt
*Assistant Examiner* — Jing Gao
(74) *Attorney, Agent, or Firm* — Lowenstein Sandler LLP

(57) ABSTRACT

A system may include an electronic device having a location sensor, and a computer-readable storage medium having programming instructions. The system may obtain, from the location sensor, a current location of the electronic device, display an electronic map representative of an area in proximity to the current location via a display of the electronic device, and display, on the electronic map, an indication of the current location of the electronic device. The system may receive a selection of a geographical location on the electronic map, and in response to receiving the selection, automatically display, on the electronic map, a visual representation of direct navigational directions from the current location of the electronic device to the selected geographical location. The display may be a touch-sensitive display, and the electronic device may receive a selection of a geographical location on the electronic map via input on the touch-sensitive display.

16 Claims, 21 Drawing Sheets

(56) References Cited

U.S. PATENT DOCUMENTS

| | | | |
|---|---|---|---|
| 2015/0008256 A1* | 1/2015 | Beadles | G06K 19/06037 235/375 |
| 2015/0120491 A1* | 4/2015 | Bisht | G06F 17/30873 705/26.5 |
| 2015/0156031 A1* | 6/2015 | Fadell | H04L 12/2816 700/276 |

* cited by examiner

HYBRID ELECTRONIC NAVIGATION AND INVITATION SYSTEM

CROSS-REFERENCE TO RELATED APPLICATIONS

This application claims the benefit of U.S. Provisional Patent Application No. 62/242,045 filed on Oct. 15, 2015, which is incorporated by reference in its entirety.

BACKGROUND

Currently, finding a desired location on an electronic map, obtaining directions to the location and inviting others to the location is a multi-step process. Often, this process also requires using multiple websites or applications, which makes the process even more inefficient, especially when using a mobile device.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system may include an electronic device having a location sensor, and a computer-readable storage medium having one or more programming instructions. The system may obtain, from the location sensor, a current location of the electronic device, display an electronic map representative of an area in proximity to the current location via a display of the electronic device, and display, on the electronic map, an indication of the current location of the electronic device. The system may receive, from a user, a selection of a geographical location on the electronic map, and in response to receiving the selection, automatically display, on the electronic map, a visual representation of direct navigational directions from the current location of the electronic device to the selected geographical location. The display may be a touch-sensitive display, and the electronic device may receive a selection of a geographical location on the electronic map via input on the touch-sensitive display.

Optionally, the system may obtain positional data from the location sensor of the electronic device. The location sensor may include a global positioning system receiver in communication with a global positioning system network, and the positional data may include positional data associated with the current location of the electronic device. The system may display an electronic map representative of an area that encompasses the current location via the display of the electronic device.

Optionally, the electronic device may display a highlighted route from the current location to the selected geographical location.

In an embodiment, a system may include a client electronic device and a host electronic device in networked communication with the client electronic device. The client electronic device may display an electronic map representative of an area via a display of the electronic device, receive, from a user, a selection of a geographical location on the electronic map, and send the received selection to the host electronic device. The host electronic device may automatically generate an electronic invitation for an event at a venue located at the selected location by determining an address for the selected location, receiving, from the client electronic device, a date of the event and a time of the event, automatically generating a unique code associated with the event, and storing the code, the address, the date, and the time in a database such that the code is associated with the address, the date and the time. The electronic invitation may include the unique code. The host electronic device may receive, from the client electronic device, an indication of a recipient to whom the electronic invitation is to be sent, and send the electronic invitation to a recipient electronic device associated with the recipient such that activation of the electronic invitation by the recipient automatically provides the recipient with directions from a current location of the recipient electronic device to the venue.

Optionally, the host electronic device may automatically generate a random alpha-numeric code.

In an embodiment, the host electronic device may receive, from the client electronic device, an email address associated with the recipient, and the host electronic device may send an email message to the email address associated with the recipient that includes the electronic invitation.

In another embodiment, the host electronic device may receive, from the user, an identifier associated with a social media account of the recipient, and the host electronic device may send a message to the social media account associated with the recipient that includes the electronic invitation.

In another embodiment, the host electronic device may receive, from the user, a phone number associated with the recipient, and the host electronic device may send a short message service (SMS) text message to the phone number associated with the recipient that includes the electronic invitation.

In an embodiment, a system may include an electronic device having a location sensor and in communication with a host electronic device, and a computer-readable storage medium having one or more programming instructions. The electronic device may receive an electronic invitation for an event that includes a code, receive input from a user that activates the received electronic invitation, obtain, from the location sensor, a current location of the electronic device, and send a request for one or more event details corresponding to the event to the host electronic device. The request may include the code and the current location of the electronic device. The client electronic device may receive, from the host electronic device, the one or more event details, and in response to receiving the one or more event details, automatically display an electronic map via a display of the electronic device. The electronic map may display direct navigational directions from the current location to a location associated with the event.

In an embodiment, the electronic device may receive an email message having the electronic invitation. In another embodiment, the electronic device may receive a social media message having the electronic invitation. In yet another embodiment, the electronic device may receive an SMS text message having the electronic invitation.

In an embodiment, the electronic device may receive a selection of the code, and the code may include a hyperlink. The electronic device to receive one or more of the following: a date associated with the event, a time associated with the event, a venue associated with the event, an address associated with the venue, and an indication of a website associated with the venue.

BRIEF DESCRIPTION OF THE DRAWINGS

FIG. 8 illustrates a flow chart of an example method of generating an electronic invitation code according to an embodiment.

FIG. 9 illustrates a flow chart of an example method of retrieving details of an electronic invitation by a recipient according to an embodiment.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players, televisions, smart televisions, smart wearable devices and the like. Various elements of an example of a computing device or processor are described below in reference to FIG. 14.

An "electronic invitation" refers to one or more digital files having information pertaining to an upcoming event.

An "electronic map" refers to one or more digital files that compile geographical and locational data into one or more virtual images.

Figure 1:
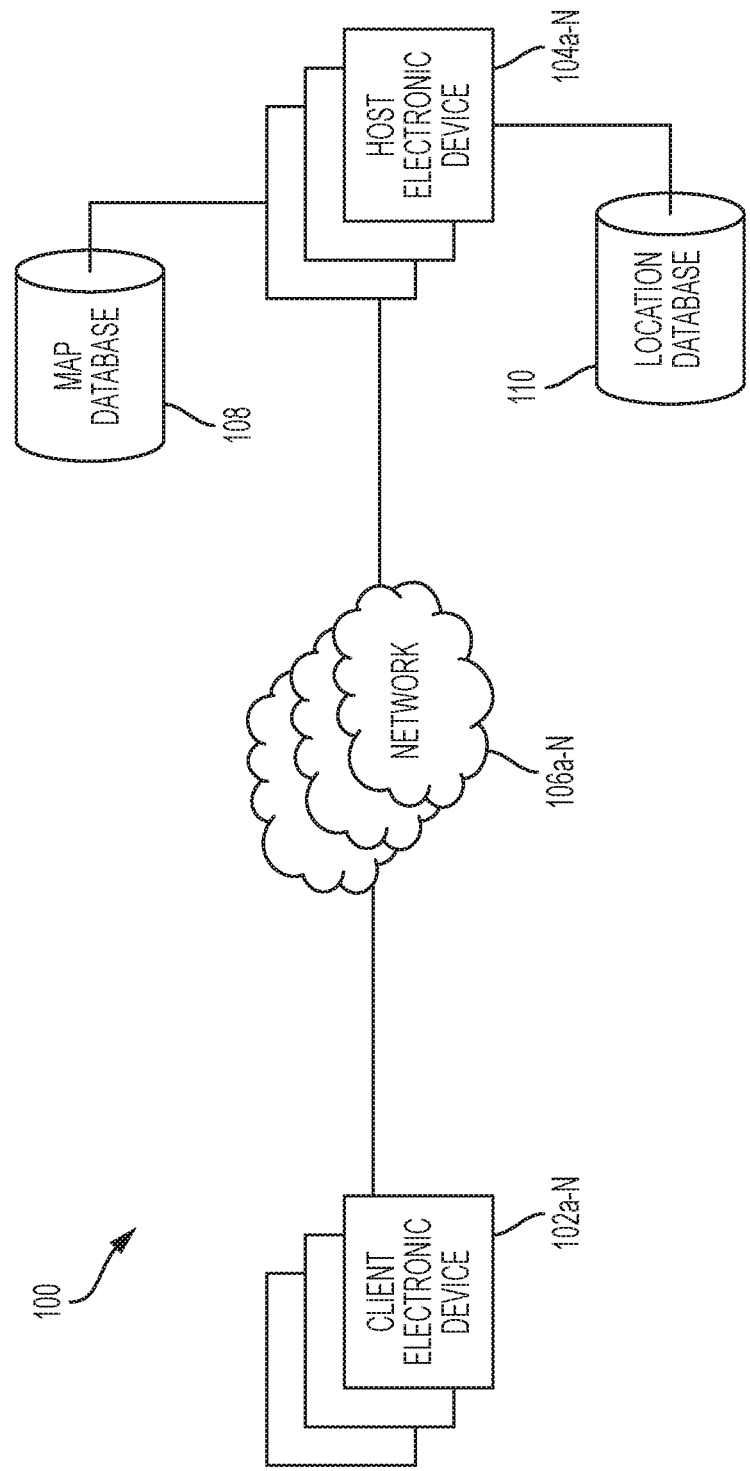
FIG. 1 illustrates an example navigation and invitation system according to an embodiment.

FIG. 1 illustrates an example navigation and invitation system according to an embodiment. In certain embodiments, the disclosed navigation and electronic invitation system may be implemented, at least in part, as an application that may reside on an electronic device. In other embodiments, the disclosed system may be implemented, at least in part, as a web-based platform that may be accessed via a web browser.

As illustrated by FIG. 1, the system 100 may include one or more client electronic devices 102a-N, in communication with one or more host electronic devices 104a-N via one or more communication networks 106a-N. Examples of client electronic devices 102 may include, without limitation, tablets, mobile phones, laptop computers, desktop computers, smart televisions, smart wearable devices and/or the like.

In an embodiment, a host electronic device 104a-N may be an electronic device associated with a service provider. For instance, a host electronic device 104a-N may be associated with a provider of a navigation, mapping and/or invitation service. Examples of host electronic devices 104a-N may include without limitation, a laptop computer, a desktop computer, a tablet, a mobile device, a server, a mainframe or other computing device. In an embodiment, a communication network 106a-N may be a local area network (LAN), a wide area network (WAN), a mobile or cellular communication network, an extranet, an intranet, the Internet, a WiFi network and/or the like.

In certain embodiments, a host electronic device 104a-N may be in communication with a map data storage facility 108 and/or a location data storage facility 110. Although a map data storage facility 108 and a location data storage facility 110 are depicted in FIG. 1 as single facilities, it is understood that each may be implemented as multiple facilities, or a combination of facilities. Example data facilities may include, without limitation, databases, lists, tables or other storage media. A map database 108 and/or a location database 110 may be components of a host electronic device 104a-N. Or, in an alternate embodiment, a map database 108 and/or a location database 110 may be accessible by a host electronic device 104a-N via a communication network.

In an embodiment, a map data storage facility 108 may store information associated with one or more electronic maps. This information may include, without limitation, street locations, coordinates of geographical locations and/or the like. A location data storage facility 110 may include information associated with one or more locations such as, for example, one or more location addresses, coordinates and/or the like.

A client electronic device 104a-N may include a display device such as a monitor or display screen. In an embodiment, the display device may be touch-sensitive. As such, a client electronic device 104a-N may receive input from a user via a touch-sensitive screen.

In various embodiments, a client electronic device 102a-N may include a microphone and/or one or more speakers. A client electronic device 102a-N may be configured to detect and respond to auditory or spoken commands. For instance, a client electronic device 102a-N may have a microphone that may capture one or more spoken commands of a user, and may translate the spoken commands into one or more actions.

In certain embodiments, a client electronic device 102a-N may include a location sensor, such as, for example, a global positioning system (GPS) receiver. A location sensor may receive positional data from an external network, such as, for example a GPS network.

Figure 2:
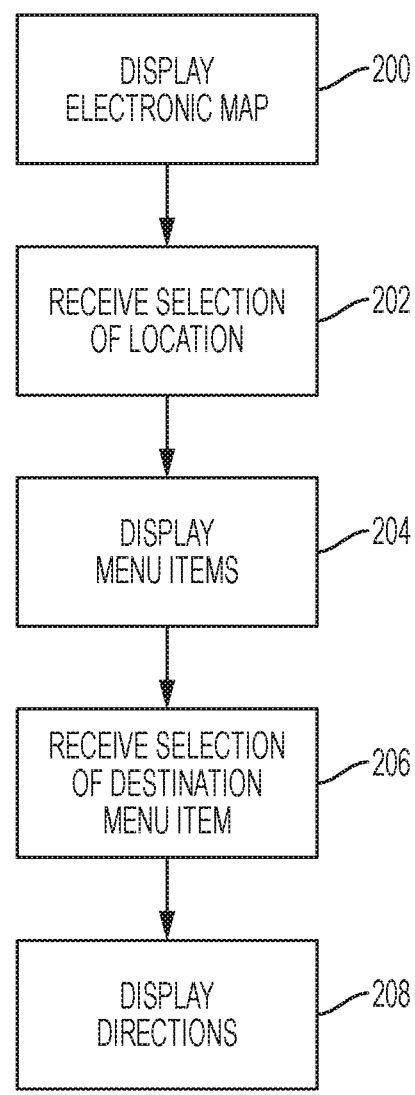
FIG. 2 illustrates a flow chart of an example method of providing automatic navigational instructions according to an embodiment.

FIG. 2 illustrates a flow chart of an example method of providing automatic navigational instructions according to an embodiment. As shown in FIG. 2, a client electronic device may display 200 an electronic map of a geographic area in proximity to a current position of the client electronic device to be displayed on a display of the client electronic device. A client electronic device may display an electronic map on a display device of the electronic device such as, for example, a user interface of a smartphone. An electronic device may display 200 an electronic map in response to receiving an instruction to open an application, access an electronic map, open a web browser, activate a uniform resource locator (URL) and/or the like. For instance, a user of a client electronic device may open a navigation or mapping application or a hybrid navigation, mapping and electronic invitation application using a client electronic device, and the client electronic device may display 200 an electronic map of an area in response.

Figure 3A:
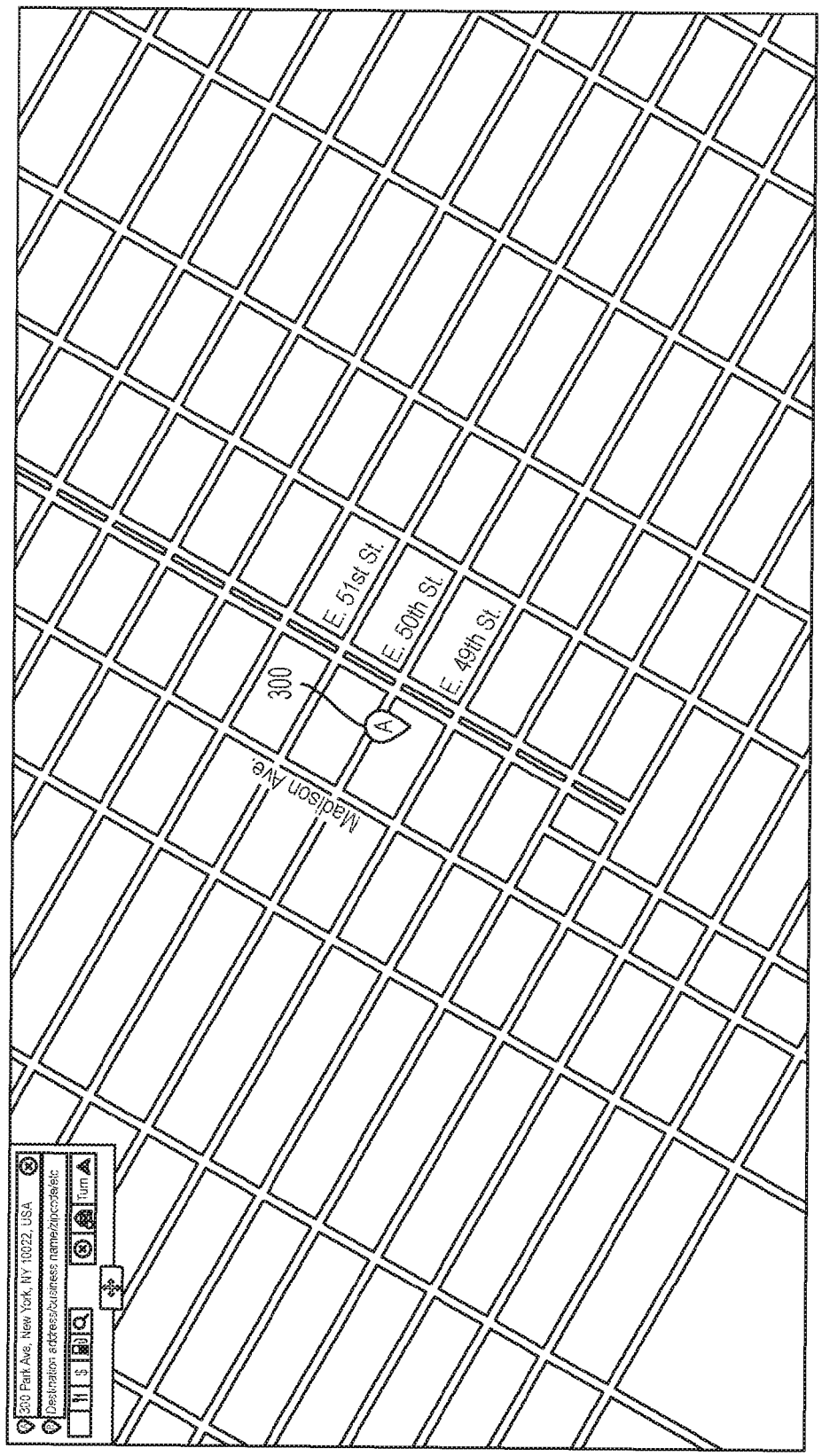
FIGS. 3A-3C each illustrates example electronic maps that may be displayed by an electronic device according to various embodiments.

In various embodiments, an electronic map that is displayed may be an electronic map of an area in proximity to where a user or client electronic device is currently located. An electronic device may obtain current positional data from a location sensor, and may use this positional data to retrieve or generate an electronic map of a proximate area, and display 200 the electronic map on a display of the client electronic device. Alternatively, a client electronic device may obtain current positional data from a location sensor, and may send this positional data to a host electronic device. The host electronic device may use the positional data to locate an electronic map of the area, and may send the map to the client electronic device. The client electronic device may display 200 the received electronic map. In other embodiments, currently positional data may be obtained based on an Internet Protocol (IP) address associated with an electronic device, a wireless or other network associated with an electronic device, and/or the like. FIG. 3A illustrates an example electronic map that may be displayed by a client electronic device according to an embodiment.

In an embodiment, a displayed electronic map may include an indication of a current location of the client electronic device. The indication may include a pin or other visual indication or marker of a current location of a client electronic device. FIG. 3A illustrates an example current location of a client electronic device with the pin labeled 'A' 300.

Referring back to FIG. 2, a client electronic device may receive 202 a selection of a location on the displayed electronic map. A client electronic device may receive 202 a selection of a location from a user via an input device such as, for example, a keyboard, a mouse, a stylus and/or the like. In another embodiment, a client electronic device with a touch-sensitive display may receive 202 a selection of a location in response to a user touching the display at or in proximity to the location.

In yet another embodiment, a client electronic device may receive 202 a selection of a location via one or more voice commands. For example, a user may speak one or more commands, such as, for example, an address, a location name, a landmark name, or other location identifier, and one or more microphones of a client electronic device may receive 202 the voice commands.

Figure 3B:
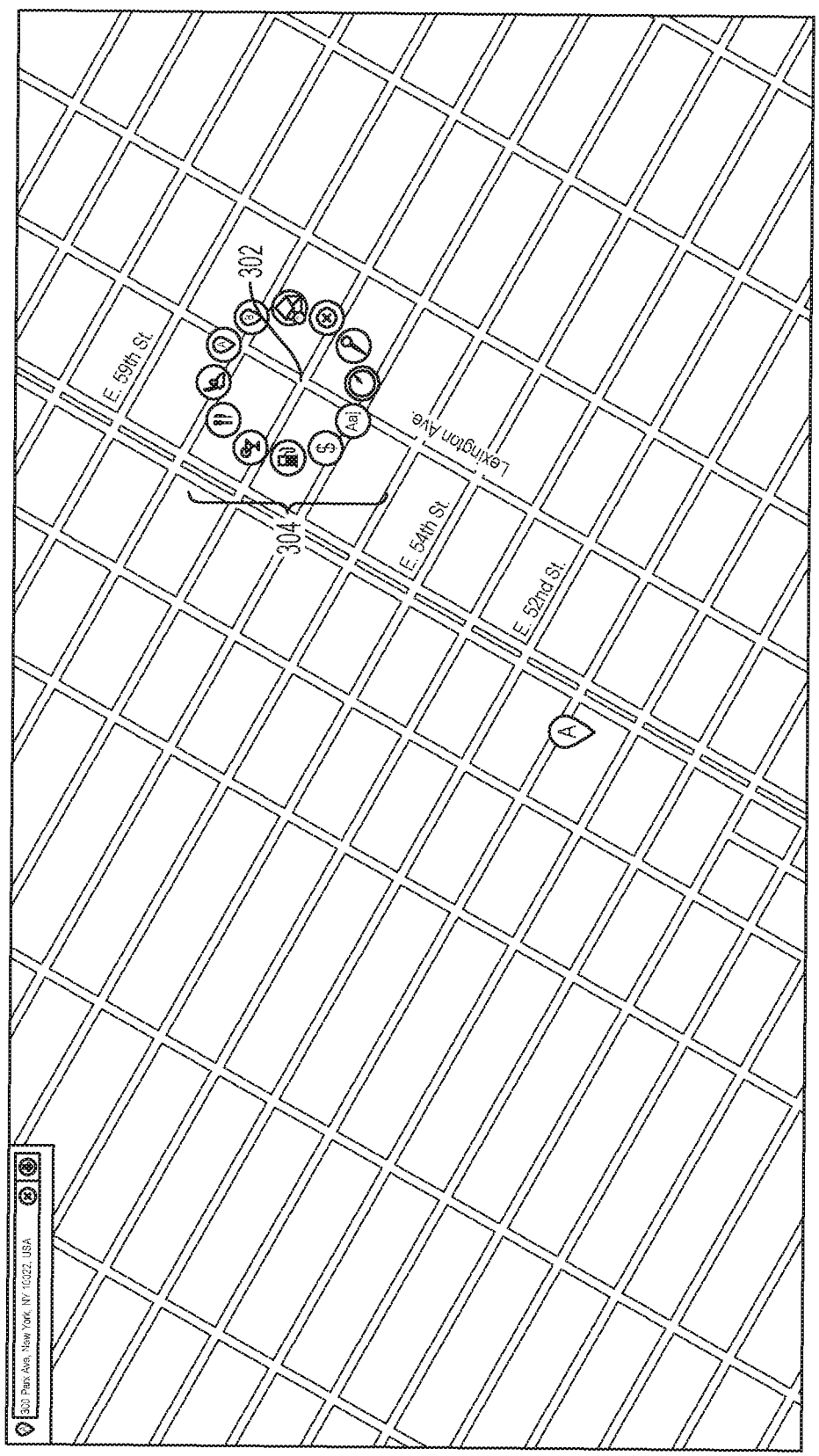

In an embodiment, a client electronic device may display 204 one or more menu items. In an embodiment, a client electronic device may display 204 one or more menu items in proximity to a selected location on the electronic map. In an alternate embodiment, a client electronic device may display one or more menu items at a fixed location on the display such as, for example, as part of a menu bar located near the top of the screen or in another position. One or more of the displayed menu items may correspond to an action to be performed or information to be provided with respect to the selected location via the electronic map. FIG. 3B illustrates example menu items 304 that may be displayed in response to receiving a selection of a location represented by reference number 302.

Figure 3C:

In an embodiment, a client electronic device may receive 206 a selection of a destination menu item. By selecting a destination menu item, a user may indicate that the selected location should be the end point or destination for the purpose of obtaining directions. In response to receiving 206 a selection of a destination menu item, a client electronic device may display 208 navigational directions from the client electronic device's current location to the selected location. For example, FIG. 3C illustrates example directions (highlighted route) from the electronic device's current location (300) to the selected location (302).

In various embodiments, a client electronic device may obtain navigational directions from a host electronic device. A client electronic device may send a request for instructions to a host electronic device that includes the client electronic device's current location and the selected destination location. The host electronic device may receive the request, and may obtain directions from a map database or other database or data structure. In another embodiment, a host electronic device may use one or more mapping algorithms to generate directions. The host electronic device may send the directions to the client electronic device which may display 208 the directions to a user. In another embodiment, a client electronic device may obtain directions by accessing one or more map databases, or by using one or more mapping algorithms.

According to various embodiments, the navigational directions may include written directions, a visual representation of directions and/or the like. For instance, the directions may include highlighting a route to take between the starting location and the ending location. In an embodiment, the directions may be provided in accordance with one or more settings. The settings may include characteristics or preferences associated with how directions should be provided. Example settings may include, without limitation, whether the directions are driving directions, walking directions, public transportation directions and/or the like. Other example settings may include that the directions are to include the fastest route, the shortest route, a route that avoids tolls, a route that avoids construction and/or the like. Additional and/or alternate settings may be used within the scope of this disclosure.

As explained above with respect to FIG. 3B, a client electronic device may cause one or more menu items to be displayed. One or more of the displayed menu items may correspond to an action to be performed or information to be provided with respect to the selected location via the electronic map.

Figure 4:
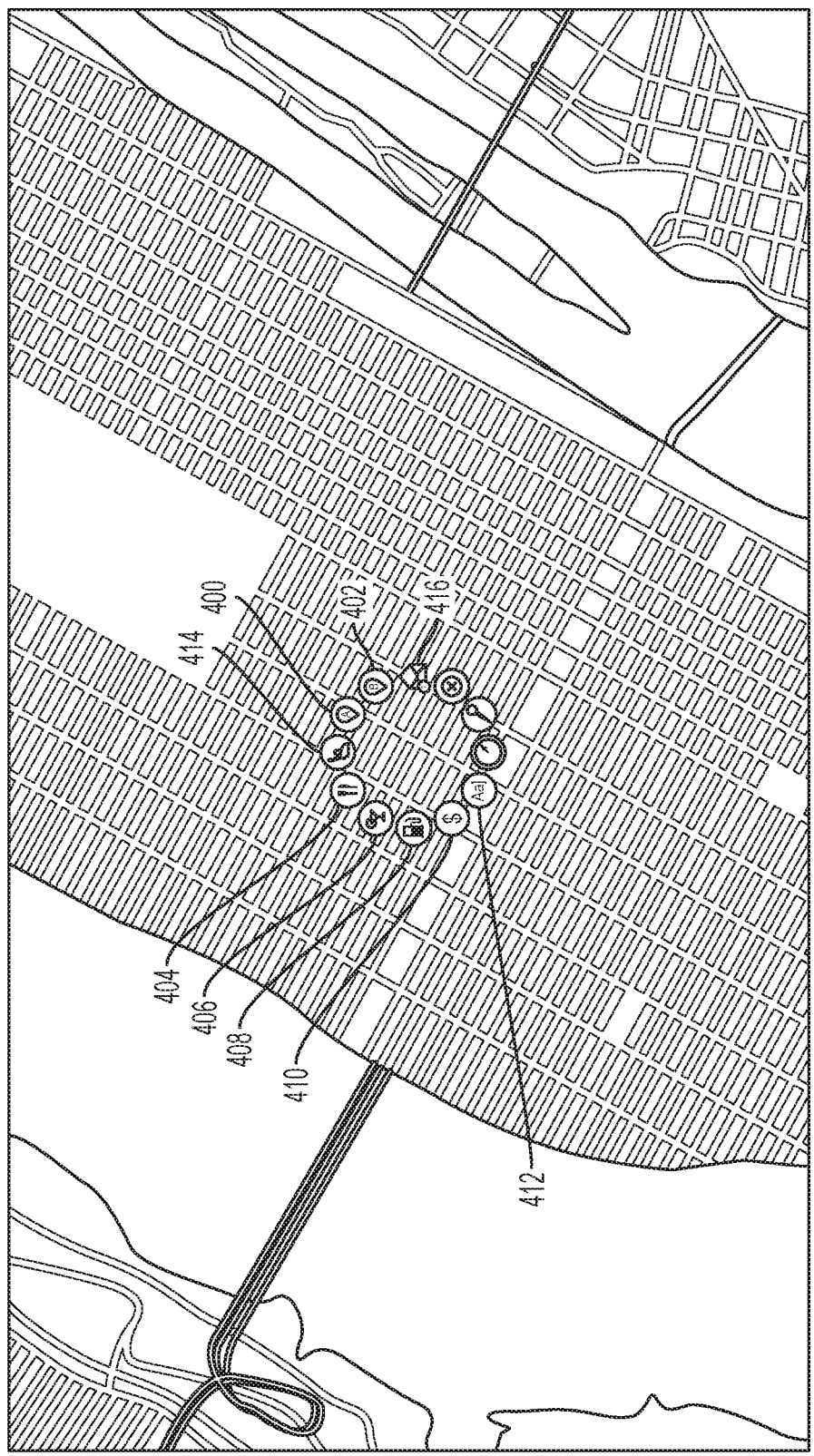
FIG. 4 illustrates example menu items according to an embodiment.

FIG. 4 illustrates example menu items according to an embodiment. As shown in FIG. 4, the menu items may include a start menu item 400, a destination menu item 402, a restaurant menu item 404, a bar menu item 406, a gas menu item 408, a bank menu item 410, a search menu item 412, an attraction menu item 414, and an invitation menu item 416. Additional and/or alternate menu items may be used within the scope of this disclosure. For instance, menu items corresponding to hotels and lodging, hospitals, pharmacies, casinos, beauty salons, sports venues and/or the like may be used.

In an embodiment, a client electronic device may receive a selection of one or more menu items. In response to receiving a selection, a client electronic device may cause one or more actions to be performed that correspond to the selected menu item. For instance, in response to receiving a selection of a start menu item, a client electronic device may identify a selected location as a starting location for directions. In an embodiment, by using a start menu item, a user may be able to obtain directions from a location that is not the current location of the user's client electronic device. For instance, a user may be at Location A, but may want to obtain directions from Location B to Location C. By selecting Location B, and then selecting a start menu item, the user may indicate that Location B should be the starting point for directions.

As another example, in response to receiving a selection of a destination menu item, a client electronic device may identify the selected location as an ending location for directions, and may determine directions from a starting location to the ending location. The directions may include written directions, a visual representation of directions and/or the like. For instance, the directions may include highlighting a route to take between the starting location and the ending location. In an embodiment, the directions may be provided in accordance with one or more settings. The settings may include characteristics or preferences associated with how directions should be provided. Example settings may include, without limitation, whether the directions are driving directions, walking directions, public transportation directions and/or the like. Other example settings may include that the directions are to include the fastest route, the shortest route, a route that avoids tolls, a route that avoids construction and/or the like. Additional and/or alternate settings may be used within the scope of this disclosure.

Figure 5:
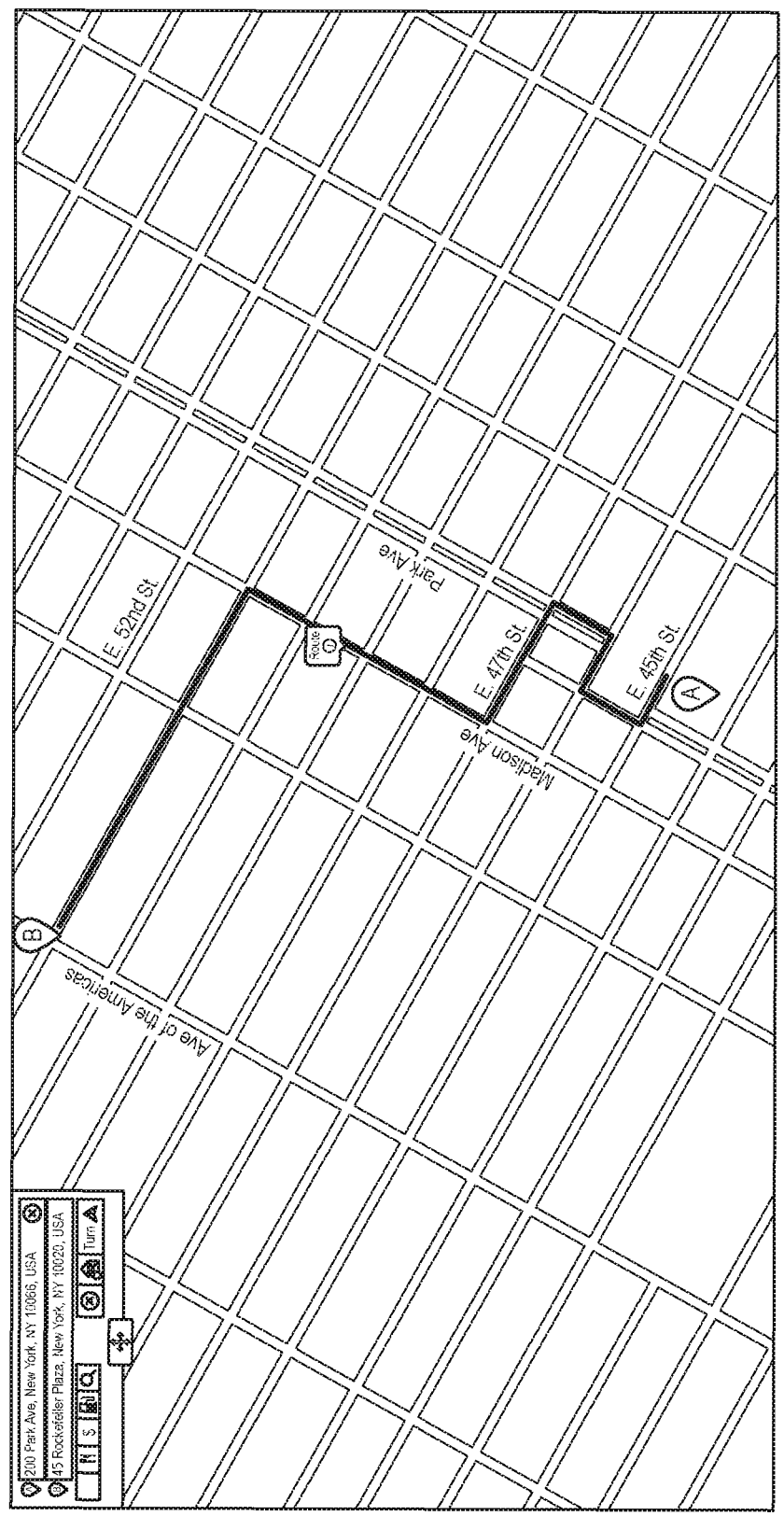
FIG. 5 illustrates a visual representation of directions between a starting location and an ending location according to an embodiment.
Figure 6A:
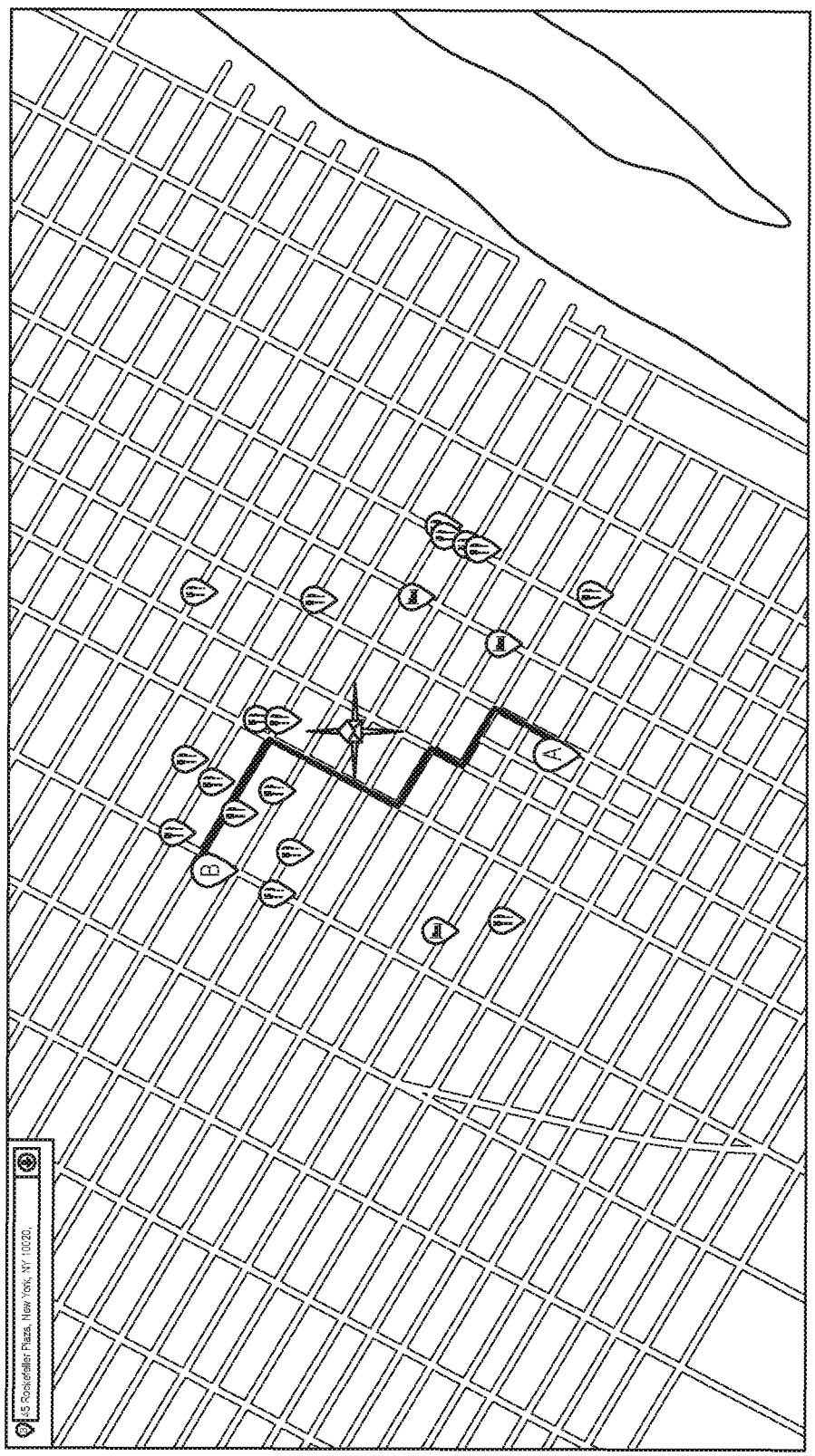
FIGS. 6A-6E each illustrates example graphical user interfaces according to various embodiments.
Figure 6B:
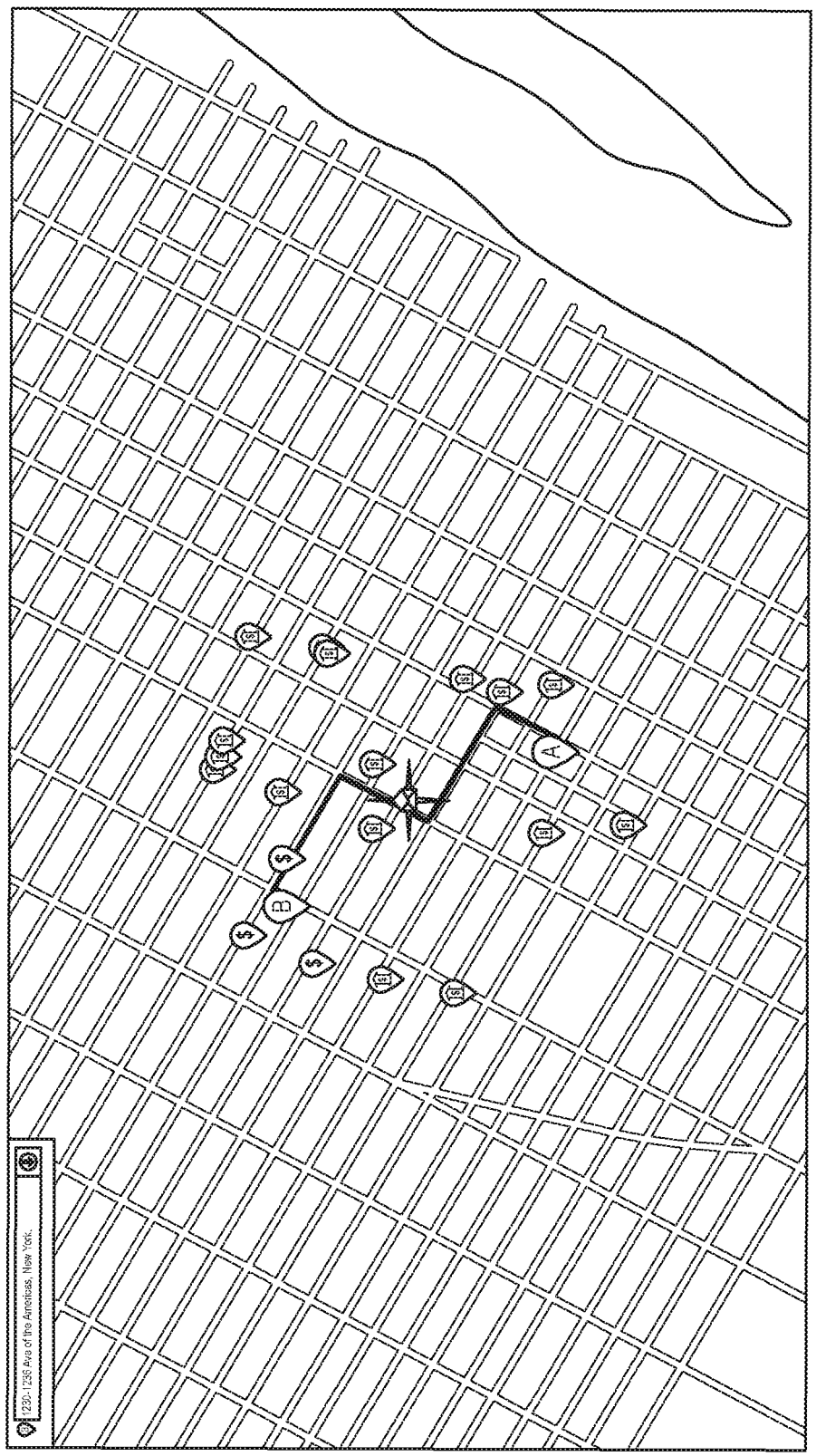
Figure 6C:
Figure 6D:
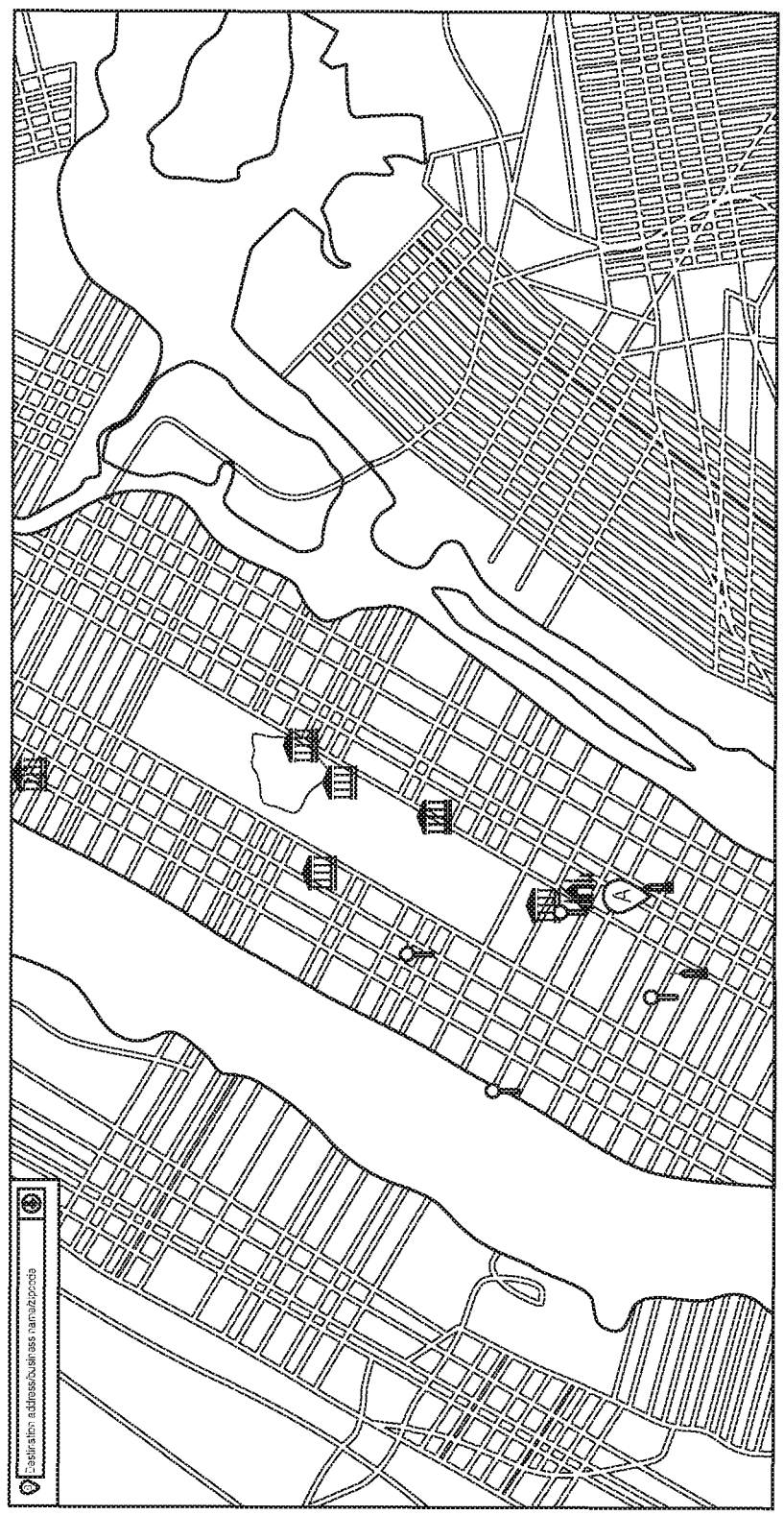
Figure 6E:
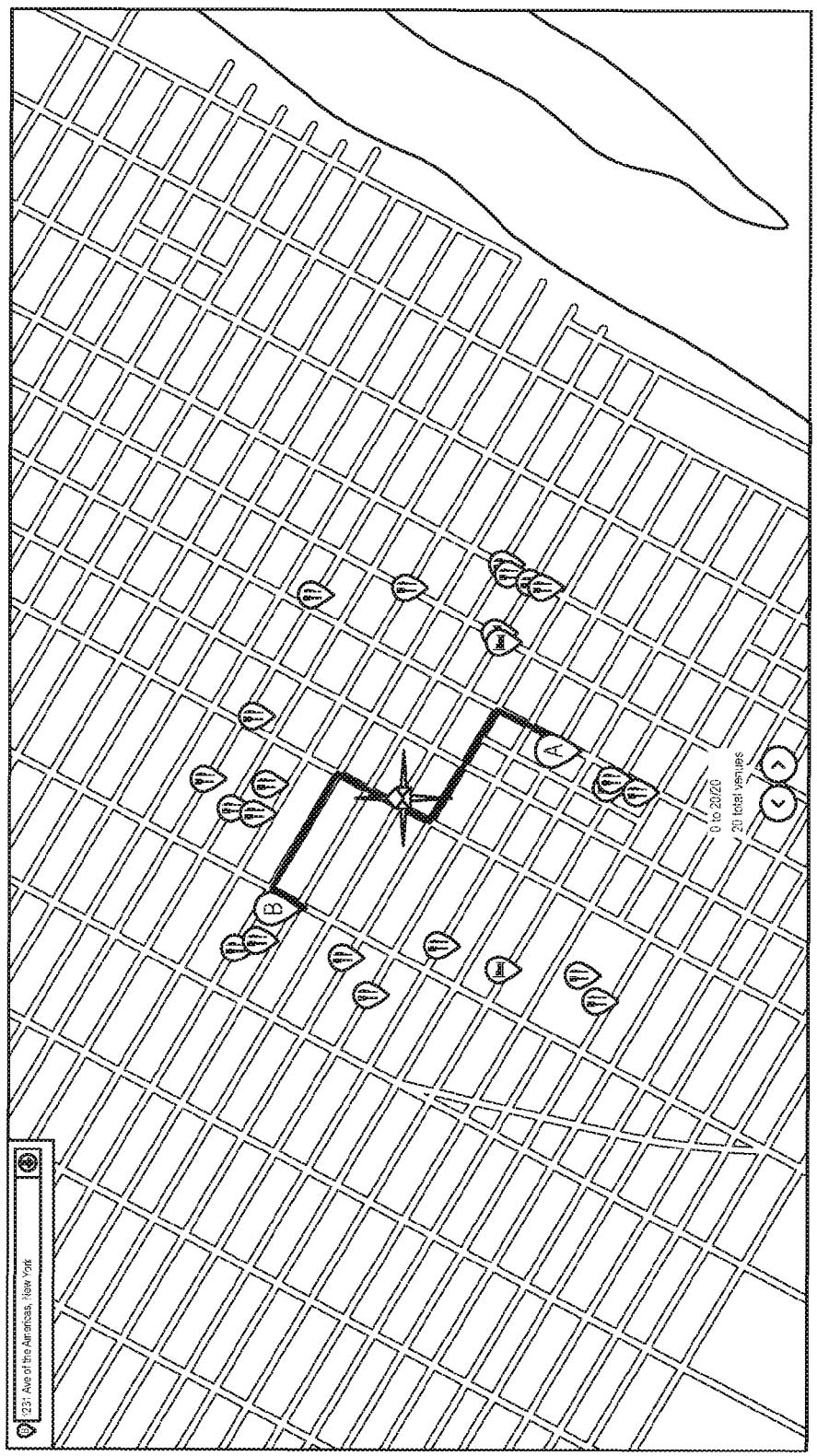

By way of example, a client electronic device may receive a selection of a location followed by a selection of a start menu item. In response, the client electronic device may cause the selected location to be a starting location for purposes of providing directions. The client electronic device may receive a selection of a different location followed by a selection of a destination menu item. In response, the client electronic device may cause the second selected location to be associated with a destination location for purposes of providing directions. The client electronic device may automatically obtain one or more sets of directions between the starting location and the destination location in accordance with one or more settings, and may cause display a visual representation of the directions to a user. For instance, the client electronic device may automatically obtain walking directions between a starting location and a destination location, and may display directions showing the route highlighted green. FIG. 5 illustrates a visual representation of directions between a starting location and an ending location according to an embodiment.

In an embodiment, in response to receiving a selection of a menu item, an electronic device may cause an indication associated with one or more locations corresponding to the menu item that are in proximity to the selected location to be displayed. The indication may be a logo, an icon, a picture, an image, a color and/or the like. In various embodiments, an indication may be displayed relative to the selected location. For instance, an indication may be displayed as an overlay to an electronic map showing the selected location.

For example, in response to receiving a selection of a restaurant menu item, a client electronic device may cause an indication associated with one or more restaurants in proximity to the selected location to be displayed. As another example, in response to receiving a selection of a bar menu item, a client electronic device may cause an indication associated with one or more bars in proximity to the selected location to be displayed. Similarly, in response to receiving a selection of a bank menu item, a client electronic device may cause an indication associated with one or more banks in proximity to the selected location to be displayed. As another example, in response to receiving a selection of a gas menu item, a client electronic device may cause an indication associated with one or more gas stations in proximity to the selected location to be displayed. As yet another example, in response to receiving a selection of an attraction menu item, a client electronic device may cause an indication associated with one or more attractions in proximity to the selected location to be displayed. An attraction may be a point of interest or other popular location such as a tourist location or other location of educational, recreational or historical purpose. Example attractions may include, without limitation, parks, museums, monuments, amusement parks, shopping malls, and/or the like.

In an embodiment, a client electronic device may access one or more databases to determine what menu item locations associated with a selected menu item are in proximity to a selected location. A menu item location may be in proximity to a selected location if it is located within a certain distance from the selected location such as, for example, within a certain block radius, within a certain distance from a selected location and/or the like. In certain embodiments, a client electronic device may use a default proximity. In other embodiments, a client electronic device may use a user-specified proximity.

In an embodiment, a database may include addresses, coordinates or other location information for one or more menu item locations. A client electronic device may use this information to identify one or more menu item locations that are in proximity to a selected location, and may display a visual indication associated with each menu item. The visual indication may be positioned and displayed on an electronic map at or near the location of the corresponding menu item location. In an embodiment, a client electronic device may receive information pertaining to menu item locations from a host electronic device, which may be in communication with a database.

According to various embodiments, a client electronic device may display information about a venue to a user. For instance, if a user hovers over a visual indication of a venue or selects a visual indication, a client electronic device may display information associated with the venue. This information may include, without limitation, the name of the venue, its address, a hyperlink to the venue's website, one or more reviews of the venue, and/or the like. FIGS. 6A-6E illustrate example graphical user interfaces showing restaurants, bars, banks, gas stations and attractions in proximity to a selected location according to an embodiment.

In various embodiments, in response to receiving a selection of a search menu item, an electronic device may prompt a user to provide a query. The prompt may include one or more free text fields, drop down menus, radial buttons, checkboxes and/or the like. For example, an electronic device may prompt a user by displaying a field in which a user may enter one or more search terms. As another example, an electronic device may prompt a user by causing one or more checkboxes to be displayed that are each associated with one or more categories of locations.

In an embodiment, a client electronic device may receive a query, and may search one or more databases to identify one or more locations that satisfy a search query and are in proximity to a selected location. In another embodiment, a client electronic device may receive a query, and send it to a host electronic device. The host electronic device may search one or more databases to identify one or more locations that satisfy the query and may return the results to the client electronic device.

For example, a user may enter the term "hospital" in a query field. A client electronic device or a host electronic device may search one or more databases to identify one or more locations in proximity to a selected location that satisfy the query. The client electronic device may display one or more indications of such locations to a user. For example, indications of the locations of hospitals and veterinary hospitals may be displayed to a user.

According to various embodiments, a selection of a menu item may be received after directions have been provided to a user. In such a case, the directions may remain displayed to the user in addition to one or more other locations corresponding to a selected menu item. For example, a client electronic device may display a route between Location A and Location B to be highlighted on an electronic map. In response to receiving a selection of a location followed by a selection of a restaurant menu item, the client electronic device may display one or more visual representations of restaurants along with the highlighted route. As such, a user may be able to see the location of restaurants near Location A, Location B and along the route from Location A to Location B.

Figure 7:
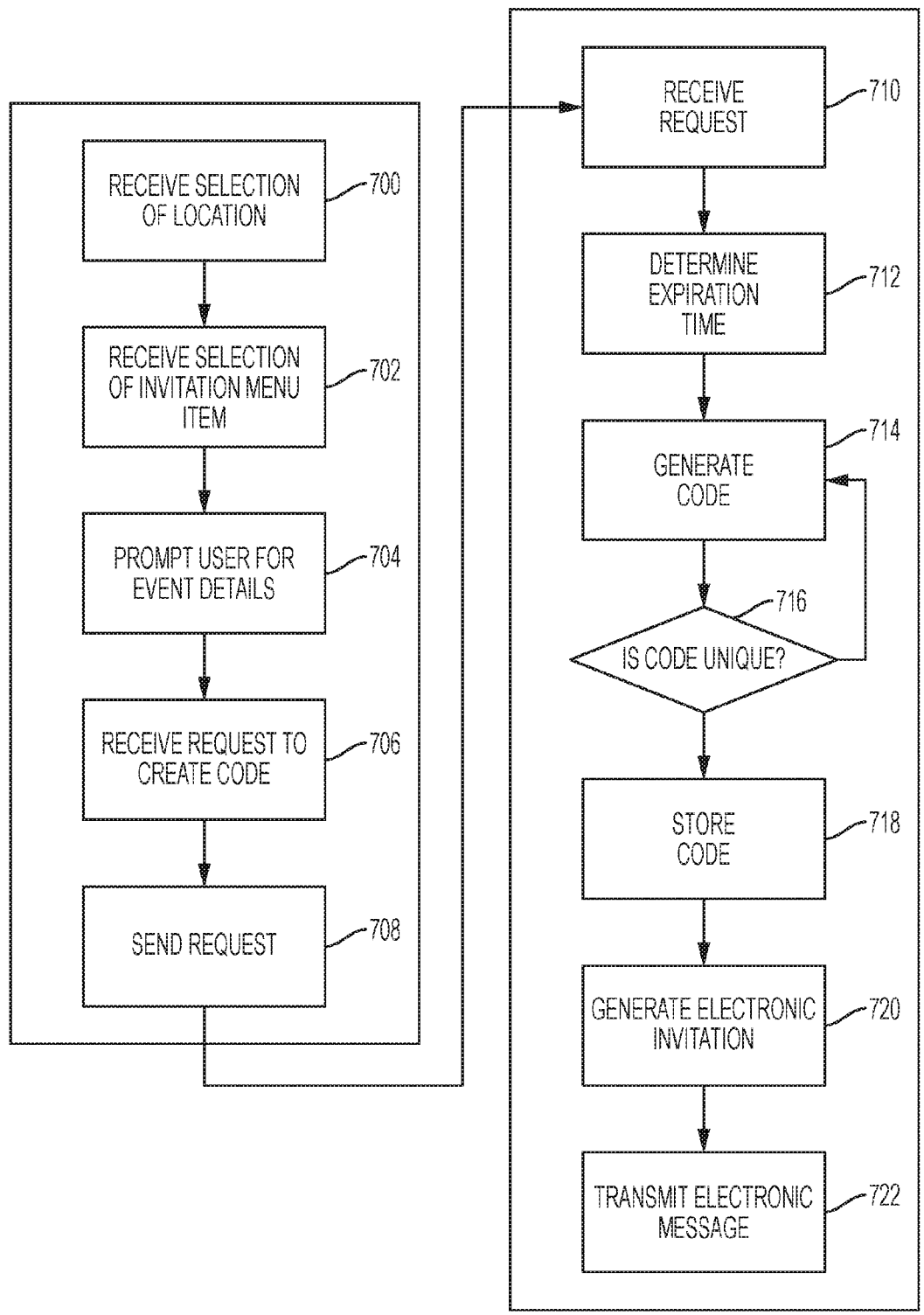
FIG. 7 illustrates a flow chart of an example method of generating an electronic invitation according to an embodiment.

In an embodiment, the system may automatically generate an electronic invitation. FIG. 7 illustrates a flow chart of an example method of generating an electronic invitation according to an embodiment. As illustrated by FIG. 7, a client electronic device may receive 700 a selection of a venue location by a user. The venue location may be a location that is displayed in response to a user selecting a menu item. For instance, a user may select a bar menu item, and a client electronic device may display icons associated with bars in the area on an electronic map in locations representative of where the bars are located. A user may select a specific icon and generate an electronic invitation using the selected bar as the venue.

Alternatively, a client electronic device may receive 700 a selection of a venue location on an electronic map. For instance, a user may select a location on an electronic map that is not marked or distinguished by a menu item. An electronic invitation may be generated using the selected location.

In various embodiments, as part of receiving a selection of a location on an electronic map, an electronic device may receive one or more coordinates as to where the selection was made on the display device. An electronic device may translate the received coordinates of the selection to one or more latitudinal or longitudinal coordinates, or other positional data associated with a physical location of the selected location such as an address and/or the like.

Figure 8:
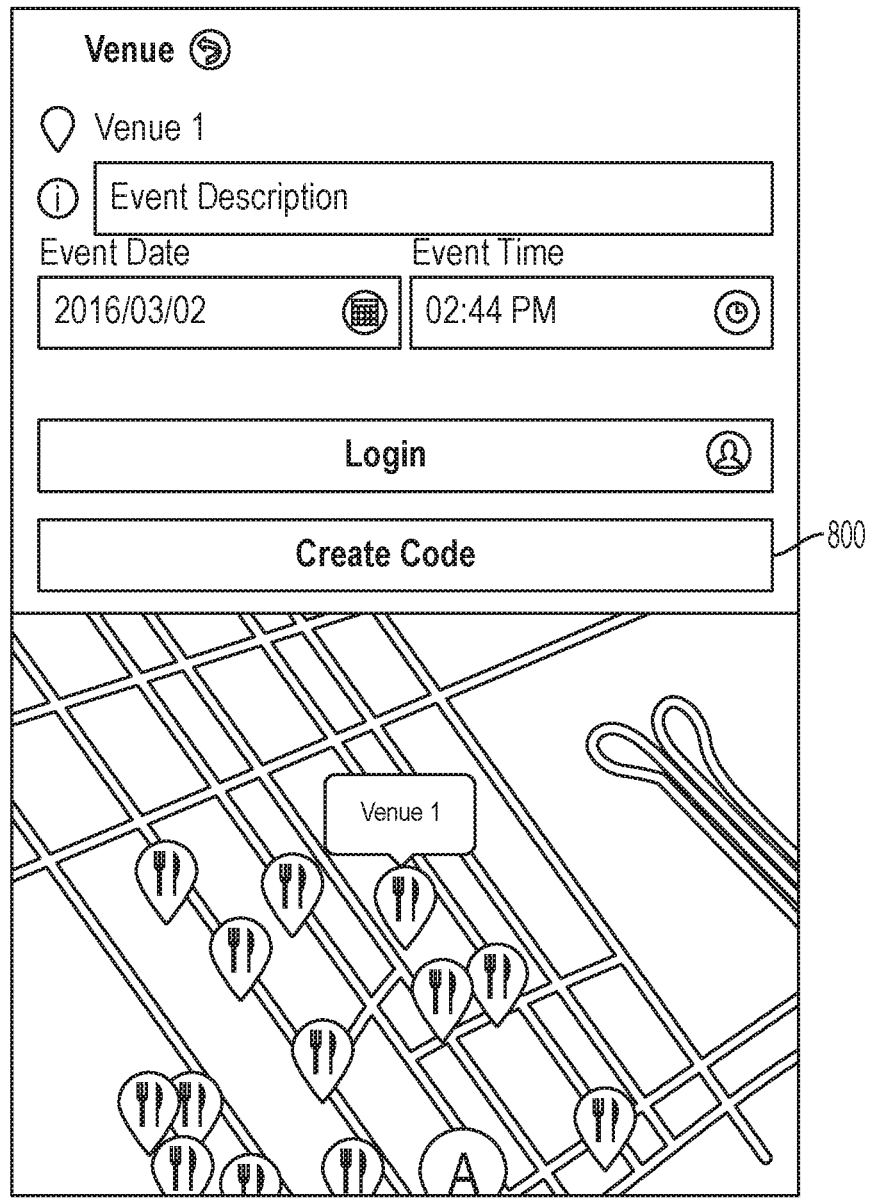
FIG. 8 illustrates an example graphical user interface showing information that an electronic device may request to create an electronic invitation according to an embodiment.

A user may select an invitation menu item to create an electronic invitation. A client electronic device may receive 702 a selection of the invitation menu item, and in response, prompt 704 the user to provide details for inclusion in the electronic invitation. These details may include, for example, an event name, an event description, a time, and a date. The address, position or location of the selected venue may automatically be included in the electronic invitation. FIG. 8 illustrates an example GUI showing information that a client electronic device may request to create an electronic invitation according to an embodiment.

After a user has provided the requested information for the electronic invitation, the user may select a button or other GUI-based feature to generate a code for the electronic invitation. For example, referring to FIG. 7, the user may select the "Create Code" button 800. A client electronic device may receive 706 the request to create a code for the electronic invitation and the provided event details. A client electronic device may send 708 the request to a host electronic device.

In an embodiment, a host electronic device may receive 710 the request. The host electronic device may determine 712 an expiration time for the code. An expiration time may represent the time that an electronic invitation expires. After an expiration time, the corresponding electronic invitation may no longer be able to be accessed. For instance, after the expiration time has passed, the corresponding electronic invitation may be deleted or otherwise rendered inaccessible.

In an embodiment, a host electronic device may determine 712 an expiration time for a code based on information provided by a user. For instance, a user may designate when the electronic invitation should expire as part of creating an electronic invitation, and the host electronic device may assign the expiration time designated by the user. In another embodiment, a host electronic device may determine 712 an expiration time for a code by determining a certain amount of time after the date and/or time of the event associated with the electronic invitation. For instance, a host electronic device may assign an expiration time equal to one week after the date and time of the event. As an example, if an event that is the subject of an electronic invitation is to occur at 6 pm on May 1, 2016, a host electronic device may determine that the expiration time for a code is 6 pm on May 8, 2016. Additional and/or alternate time periods may be used within the scope of this disclosure.

In an embodiment, a host electronic device may determine an expiration time for a code based on an event title or event description associated with an electronic invitation. For instance, a real estate broker may want to create an electronic invitation for a listing. The event description may indicate "apartment listing," "real estate listing" or the like. In an embodiment, real estate listings may expire four weeks after they are generated, so an expiration time of four weeks may be assigned to the corresponding code.

In an embodiment, a host electronic device may generate 714 a code. A code may be an alphanumerical code that includes numbers, characters, symbols and/or the like. In an embodiment, an electronic device may generate 714 a random code associated with an electronic invitation. In an alternate embodiment, an electronic device may generate 714 a code that is based on at least a portion of the information included in the electronic invitation.

In certain embodiments, a host electronic device may generate 714 a custom code. A custom code may be based on user input. For instance, a user may request that a custom code provided by the user be assigned to an electronic invitation. For instance, a real estate broker named John Smith may want a custom code for a listing that identifies his real estate business. He may request that a certain listing be assigned a customer code "JohnSmithRealty/Listing12." In an embodiment, a host electronic device may generate 714 the requested custom code. In certain embodiments, a host electronic device may generate 714 a custom code after the requestor is verified. For example, that the requestor is affiliated with the business for which he is requesting a code.

A host electronic device may determine 716 whether the generated code is unique. In an embodiment, a host electronic device may maintain or be in communication with a code database or other data structure that stores all active codes. An active code may be a code having an expiration time that has not yet occurred. An electronic device may determine 716 whether a generated code is unique by determining whether the generated code is already being stored by a code database. If so, the electronic device may generate 714 a new code.

Once an electronic device has determined that a generated code is unique, the electronic device may store 718 the unique code, the corresponding event details and the corresponding expiration time in the code database. In an embodiment, a code database may be a relational database. A code may be stored in a way such that it is associated with its corresponding event details and expiration time.

In an embodiment, a code database may store an indication of the user who generated a code such that the indication is associated with the code. For example, a user may have an account or otherwise be registered with a service provider. The indication may be a username or other unique identifier associated with the user account. As such, a user who is logged into the service may be able to access previously created and/or received codes associated with the user's account. Table 1 illustrates example entries of a code database according to an embodiment.

TABLE 1

| Code | User | Event Details | Expiration Time |
| --- | --- | --- | --- |
| OE452GW | jjones | Drinks with Adam Bar ABC 123 Main Street, New York, NY 12345 Apr. 30, 2016 8 pm | 8 pm, May 7, 2016 |
| BFH210LP | rlee | Dinner with Mom Restaurant X 345 Main Street, New York, NY 12345 Jun. 2, 2016 6 pm | 6 pm, Jun. 9, 2016 |

Referring back to FIG. 7, a host electronic device may generate 720 an electronic invitation by generating an electronic message that includes the generated code. The electronic message may be an email, a social media message, a short message service (SMS) text message and/or the like. In an embodiment, the type of electronic message that is generated may depend on input received by a user. For instance, a client electronic device may present a user with a menu of available types of electronic messages that may be generated. In response to receiving a selection of a message type from a user, a client electronic device may convey the selection to a host electronic device, which may generate a corresponding message.

In an embodiment, a host electronic device may transmit 722 an electronic message to one or more electronic devices associated with one or more recipients over one or more communications networks. A client electronic device may prompt a user to identify one or more recipients. A user may identify one or more recipients by providing a unique identifier associated with one or more recipients. For instance, if a user is sending an invitation to a recipient over email, the user may provide the recipient's email address. Alternatively, the platform described in this disclosure may communicate with a user's email account. For instance, a user may log in to (or otherwise provide the user's credentials for) an email account from the platform thereby allowing the platform and email service to communicate and share information. As such, a user may identify a recipient from the user's contact list maintained by the user's email service.

As another example, if a user is sending an invitation to a recipient via a social media message, the user may provide the recipient's screen name, handle, user name and/or the like for the social media platform. Alternatively, the platform described in this disclosure may communicate with one or more of a user's social media accounts. For instance, a user may log in to a social media account (or otherwise provide the user's credentials for such an account) from the platform thereby allowing the platform and social media account to communicate and share information. As such, a user may identify a recipient from the user's friend lists, followers or other contact list maintained by the corresponding social media provider.

As another example, if a user is sending an electronic invitation to a recipient via a text message, the user may provide the recipient's phone number. Alternatively, the platform described in this disclosure may communicate with a user's contact lists. For instance, a platform operating on a user's mobile phone may access the user's phone contacts. As such, a user may identify a recipient from the user's phone contacts.

A client electronic device may send an indication of a desired communication method and contact information for a recipient to a host electronic device. A host electronic device may transmit 722 an electronic invitation to one or more identified recipients according to the transmission method selected by a user. For instance, if an electronic invitation is to be sent as an email message, a host electronic device may transmit 722 an email message to the email account of the identified recipient. Alternatively, if an electronic invitation is to be sent as a social media message, an electronic device may transmit 722 a social media message to a social media account of the identified recipient. As another example, if an electronic invitation is to be sent as a text message, an electronic device may transmit 722 a text message to an electronic device of the identified recipient.

Figure 9A:
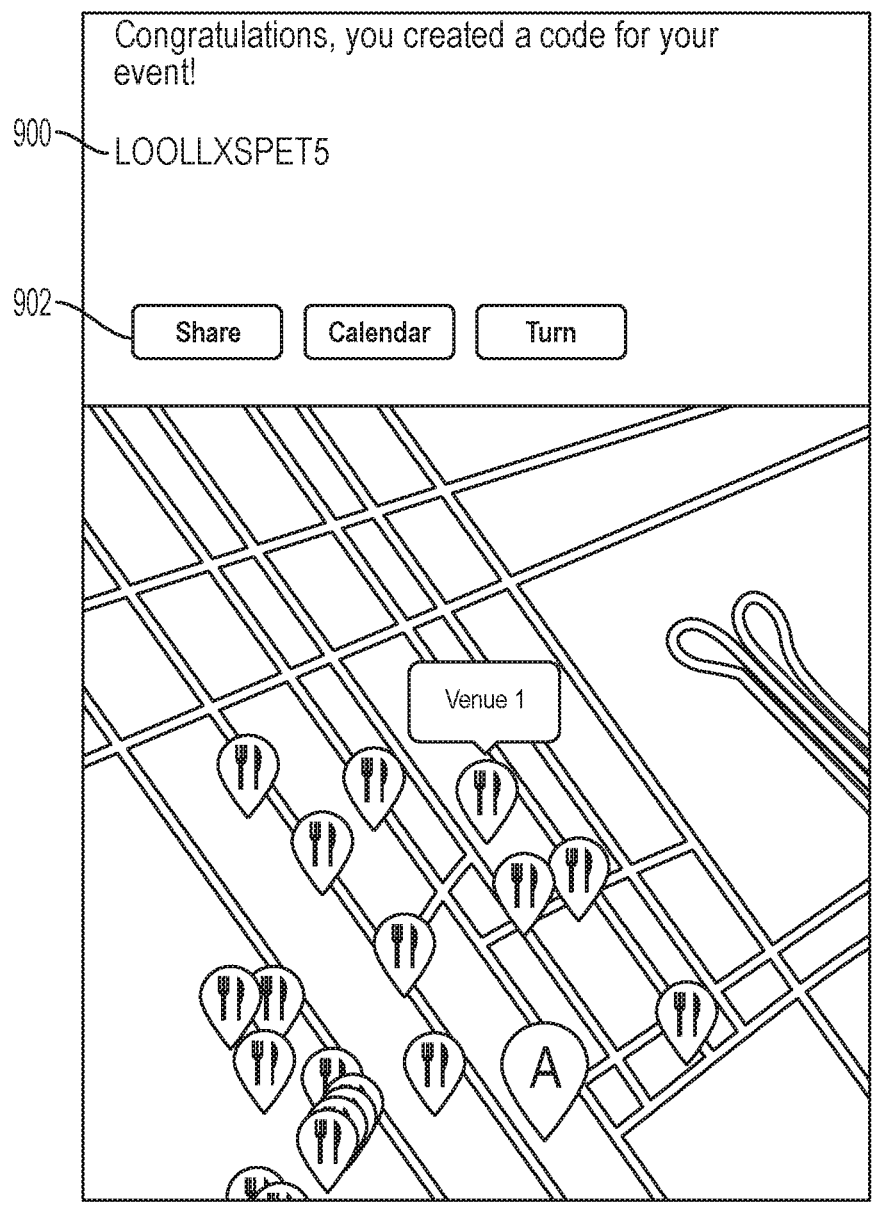
FIG. 9A illustrates an example notification that may be displayed by a client electronic device to a user according to an embodiment.
Figure 9B:
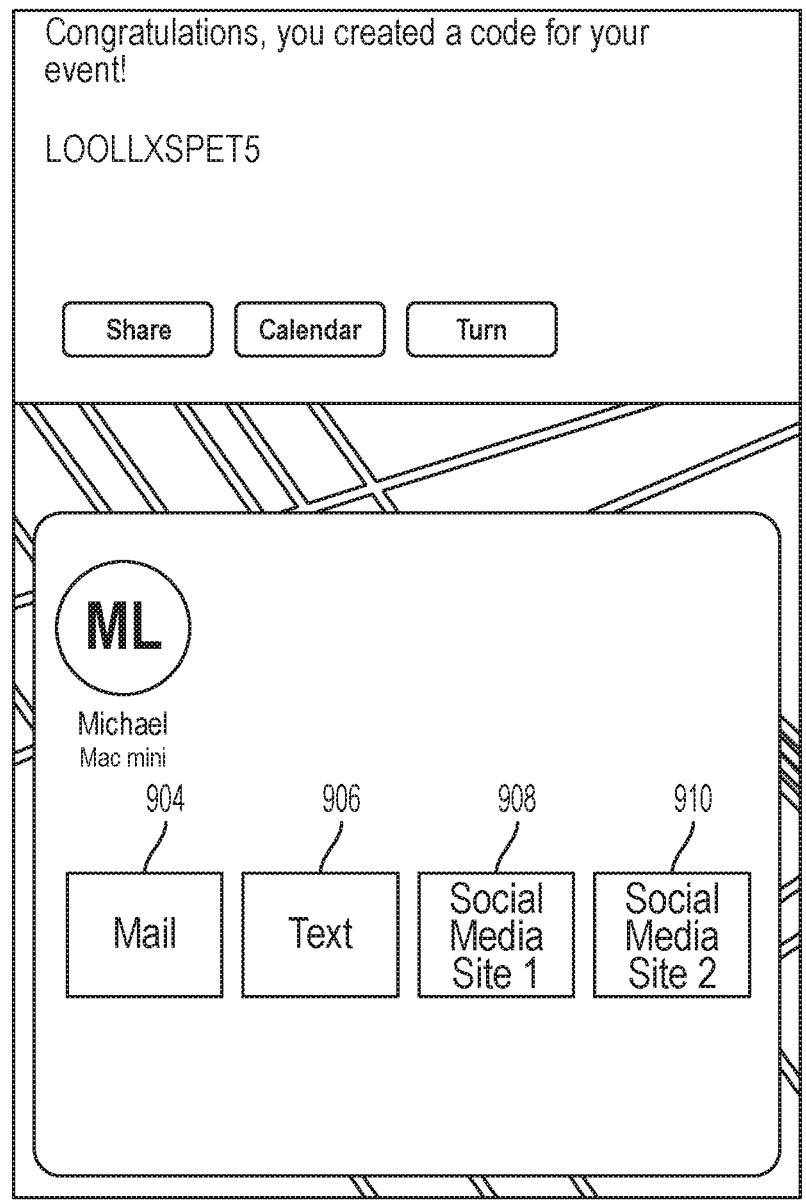
FIG. 9B illustrates an example graphical user interface that a user may use to select a transmission method for an electronic invitation according to an embodiment.

For example, FIG. 9A illustrates an example notification that may be displayed by a client electronic device to a user once a code has been generated. As illustrated by FIG. 9A, the notification may include the generated code 900. The notification may also include an element 902 through which a user may indicate the generated code is to be shared. In response to a user selecting the element 902, a client electronic device may display one or more available ways that the code can be shared, as illustrated by FIG. 9B. For example, as shown by FIG. 9B, an option for mail 904, text 906, or social media sites 908, 910 may be presented.

In various embodiments, a client electronic device may perform one or more of steps 712, 714, 716, 718, 720, 722 described above. For instance, if a client electronic device is offline or otherwise unable to communicate with host electronic device, a client electronic device may perform one or more of these steps.

Figure 10:
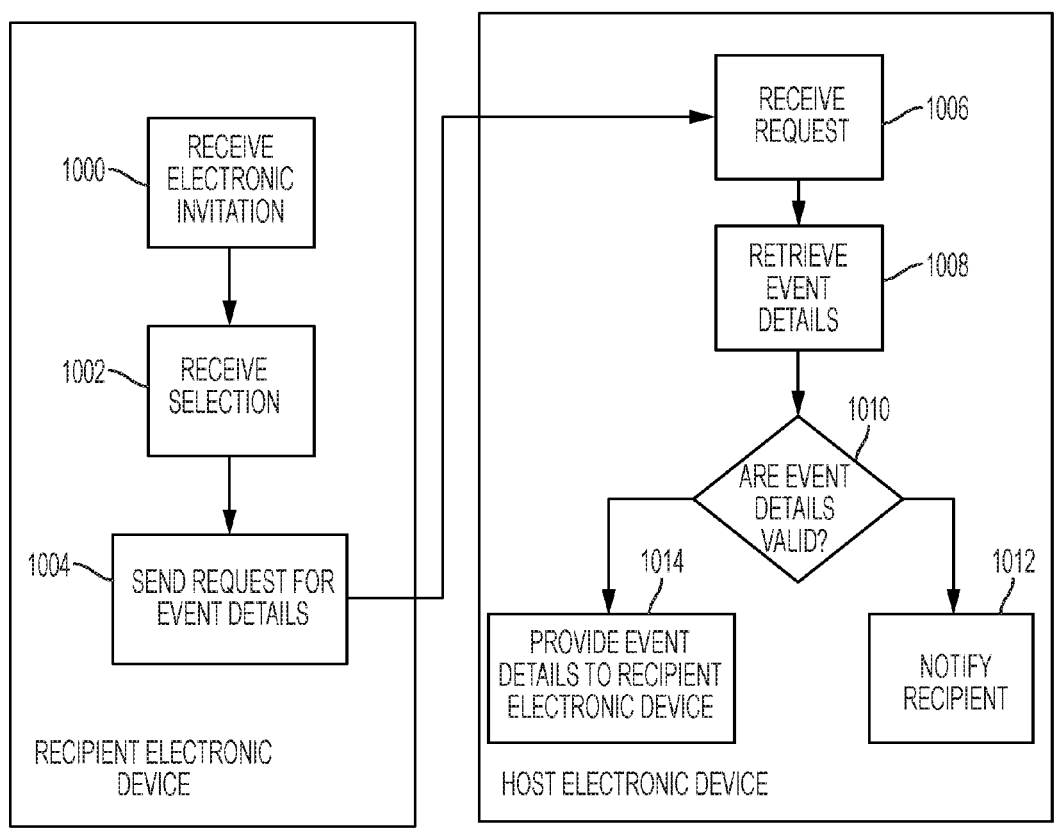
FIG. 10 illustrates a flow chart of an example method of retrieving details of an electronic invitation by a recipient according to an embodiment.

FIG. 10 illustrates a flow chart of an example method of retrieving details of an electronic invitation by a recipient according to an embodiment. As illustrated by FIG. 10, a recipient may receive 1000 an electronic invitation. The recipient may receive 1000 an electronic invitation via the recipient's electronic device, such as a mobile phone, a tablet, a smart wearable device and/or the like. For example, if the electronic invitation was sent as an email, a recipient may receive an email message containing the electronic invitation. As another example, if the electronic invitation was sent as a text message, a recipient may receive a text message containing the electronic invitation. As yet another example, if the electronic invitation was sent as a social media message, a recipient may receive a social media message containing the electronic invitation.

Figure 11:
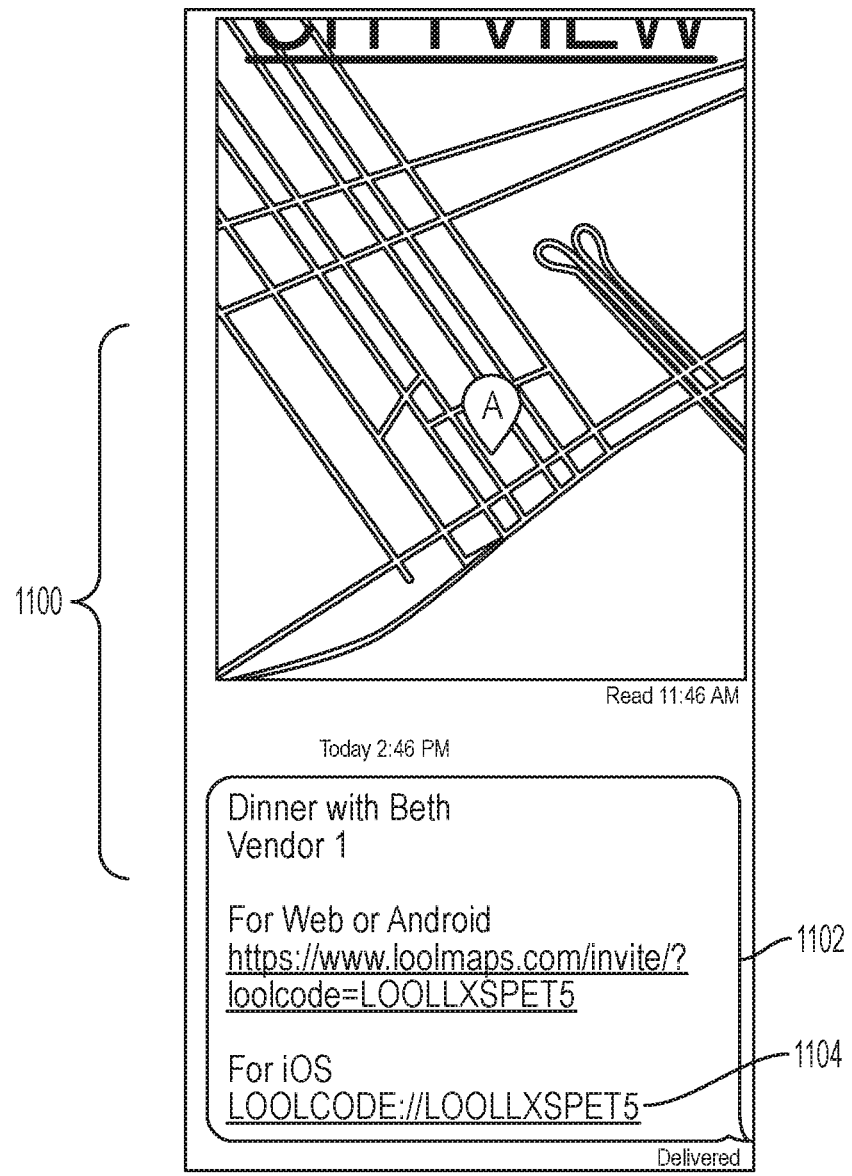
FIG. 11 illustrates an example electronic invitation that may be received by a recipient via an SMS text message according to an embodiment.

FIG. 11 illustrates an example electronic invitation that may be received by a recipient via an SMS text message according to an embodiment. As shown by FIG. 11, the electronic invitation 1100 may include one or more codes 1102, 1104 such as a generated code discussed above. The code may be formatted differently depending on platform. For instance, the code may be formatted one way for Android or web users, and a different way for iOS users.

In an embodiment, a recipient's electronic device may receive 1002 a selection of an electronic invitation by a recipient. For instance, referring to FIG. 11, a recipient may select either hyperlinked code 1102, 1104. In response to receiving a selection of the electronic invitation, the recipient's electronic device may send 1004 a request for the event details to a host electronic device. The request may include information associated with the electronic invitation such as, for example, the corresponding code, the recipient's contact information and/or the like. In certain embodiments, the request may include a current location of the recipient's electronic device. For example, a recipient's electronic device may receive current positional information from a location determining device, and may include the positional information in a request for event details.

A host electronic device may receive 1006 the request, and may use at least a portion of the information included in the request to retrieve 1008 the corresponding event details. For instance, a host electronic device may receive 1006 a request that includes a code, and may retrieve 1008 the corresponding event details from a code database based on the code. In an embodiment, a host electronic device may determine 1010 whether the corresponding event details are still valid. For instance, a host electronic device may determine 1010 whether an expiration time associated with the code has passed. A host electronic device may determine 1010 whether an expiration time associated with the code has passed by accessing the expiration time associated with the code from the code database, and comparing it to a clock time of the host electronic device or another value associated with a current date and time.

If a host electronic device determines that the event details are invalid, for example, if the expiration time associated with a code has passed, the host electronic device may not retrieve event details, and may send 1012 a recipient electronic device a notification that the event details are no longer accessible.

If a host electronic device determines that event details are valid, the host electronic device may provide 1014 the retrieved event details associated with the electronic invitation to the recipient's electronic device.

As an example, a received message may include a code presented as a hyperlink. In response to receiving a selection of the code, the recipient's electronic device may send 1004 a request to a host electronic device requesting event details for the electronic invitation. The request may include the code. The host electronic device may receive 1006 the request and may retrieve 1008 the corresponding event details from a code database based on the received code. The host electronic device may determine 1010 that the expiration time associated with the code has not passed, and may provide 1014 the retrieved event details to the recipient's electronic device. A recipient's electronic device may cause a separate window to automatically be opened to display the retrieved event details.

Figure 12:
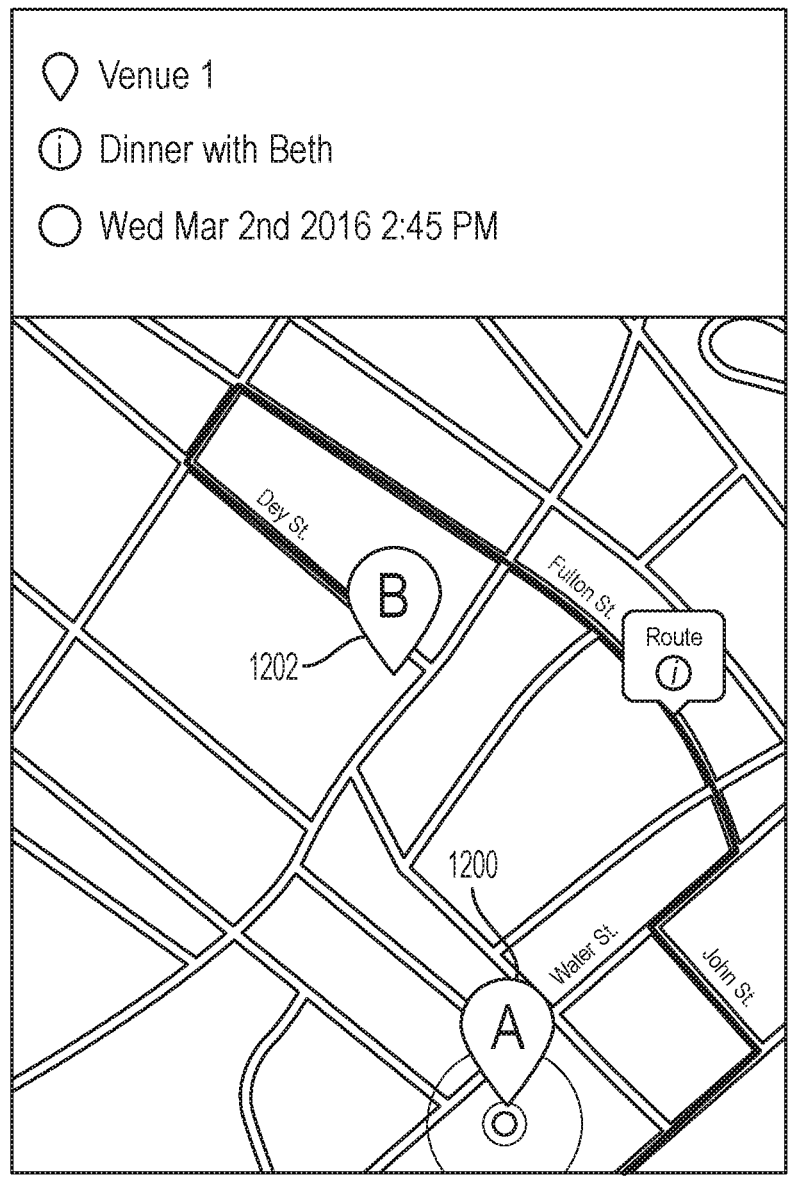
FIG. 12 illustrates an example graphical user interface that may be displayed to a recipient according to an embodiment.

FIG. 12 illustrates an example GUI that may be displayed to a recipient in response to the recipient selecting one of the codes 1102, 1104 of FIG. 11. As illustrated by FIG. 12, by selecting the code, the recipient is presented with an electronic map that includes directions from the current location of the recipient's electronic device (as represented by pin A 1200) to the venue that is the subject of the electronic invitation (as represented by pin B 1202).

As another example, a received message may include a code and a hyperlink. In response to receiving a selection of the hyperlink, a recipient's electronic device may send 1004 a request to a host electronic device requesting event details for the electronic invitation. The host electronic device may receive 1006 the request, and may retrieve 1008 the corresponding event details. In an embodiment, a host electronic device may retrieve 1008 corresponding event details by prompting a user to provide a code, such as the code that was included in the electronic invitation. In response to receiving the code, the host electronic device may use the code to retrieve 1008 corresponding event details from a code database, determine 1010 that an expiration time associated with the code has not passed, and may provide 1014 the retrieved event details to be displayed to the recipient.

In an embodiment, a user may have an option to add the event details to a calendar. For instance, the event details may include an option to add the event details to a calendar. In response to receiving an indication to add the event details to a calendar, such as, for example, a selection of an icon, a recipient electronic device may cause the event details to be added to the recipient's electronic calendar at the appropriate day and time.

In an embodiment, if a recipient has the disclosed platform operational on the recipient's electronic device, such as, for example, as an application on the recipient's smart phone, then selecting the code or a hyperlink of an electronic invitation may cause the recipient's electronic device to open an instance of the platform on the recipient's electronic device and display the event details associated with the electronic invitation.

In certain embodiments, displaying event details to a recipient may include automatically providing the recipient with direct navigational information to the venue associated with the electronic invite from the recipient's current location. The direct navigational information may include written directions from the recipient's current location to the venue, a visual representation of directions from the recipient's current location to the venue or a combination of written directions and visual representation of directions. For instance, upon activating an electronic invitation, a recipient may automatically be provided with directions from the recipient's current location to the venue that is the subject of the electronic invitation. These directions may be provided on an electronic map. For instance, the recipient's current location may be represented by a visual representation, the venue may be represented by a different visual representation, and the directions may be provided as a highlighted route or path to take between the recipient's current location and the venue location.

In an embodiment, these directions may be updated each time a recipient activates an electronic invitation. For instance, a recipient may receive an electronic invitation on a Monday for a birthday party occurring at Venue X the following Saturday. The recipient may activate the electronic invitation when he receives it while at his office to check out Venue X. Upon this activation, the recipient may be provided with directions from his office to Venue X. On Saturday afternoon, the recipient may again activate the electronic invitation, but this time from his apartment. The recipient may be provided with directions from his apartment to Venue X. In an embodiment, a recipient may receive automatic directions from the recipient's current location to a particular venue that is the subject of an electronic invitation every time the recipient activates the electronic invitation before the electronic invitation's expiration time.

Figure 13:
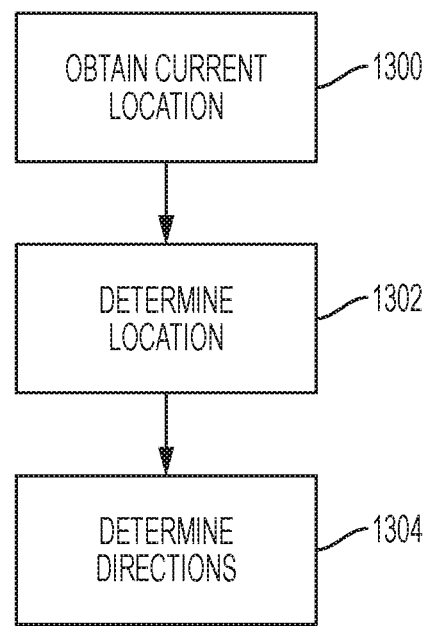
FIG. 13 illustrates a flow chart of an example method of providing direct navigational information according to an embodiment.

FIG. 13 illustrates a flow chart of an example method of providing direct navigational information according to an embodiment. As illustrated by FIG. 13, in response to receiving a request for event details, a host electronic device may obtain 1300 a current location associated with a recipient electronic device. A host electronic device may obtain 1300 a current location of a recipient electronic device by sending a request for such information to the recipient electronic device. In response to receiving a request, a location sensor of the recipient electronic device may obtain positional data from an external network, and the recipient electronic device may send the obtained positional data to the host electronic device. In another embodiment, a request for event details may include a current location associated with a recipient electronic device.

A host electronic device may determine 1302 a location of a venue associated with an electronic invitation. For instance, a host electronic device may retrieve from a code database an address of a venue corresponding to a particular electronic invitation.

In an embodiment, a host electronic device may determine 1304 a set of directions from the recipient's current location to the location of the venue. For instance, the directions may include highlighting a route on an electronic map to take between the recipient's current location and the venue location. In an embodiment, the directions may be provided in accordance with one or more settings associated with the recipient. The settings may include characteristics or preferences associated with how directions should be provided. Example settings may include, without limitation, whether the directions are driving directions, walking directions, public transportation directions and/or the like. Other example settings may include that the directions are to include the fastest route, the shortest route, a route that avoids tolls, a route that avoids construction and/or the like. Additional and/or alternate settings may be used within the scope of this disclosure.

In various embodiments, a displayed electronic map may include one or more selectable codes. In certain embodiments, the codes may be displayed as visual representations and positioned relative to certain locations on the electronic map. Alternatively, the codes may be displayed as visual representations and as part of a menu, toolbar, or other display. A displayed code may be associated with a business, a product, a service and/or the like. Selecting a code may automatically route a user to the destination associated with the code from the user's current location.

In various embodiments, an owner of a code may update an address associated with the code via an account. For instance, an owner of a code may be able to login to the owner's account, and change an address associated with the code. This is particularly useful for businesses, activities or events that are consistently changing locations such as, for example, food trucks, pop-up shops, and/or the like.

For instance, a particular food truck may be associated with the code +TACOTRUCK. A user may select the code to be automatically routed to the food truck from the user's current position. Because the food truck may change its location frequently, it may be hard for a user to keep track of where the food truck is on a certain day. Instead, by simply selecting the code, the user may be routed directly to the location of the food truck at that particular time.

A client electronic device may receive a selection of a code, and may send the selection and/or a current location of the client electronic device to a host electronic device. The host electronic device may receive the selection and/or the current location, and may obtain a destination location associated with the code. For instance, a host electronic device may access a code database to retrieve a current destination address associated with the code. The host electronic device may use the current location of the client electronic device and the retrieved destination location associated with the code to obtain directions from the former to the latter. The host electronic device may return the directions to the client electronic device. The client electronic device may, in turn, cause an electronic map displaying the directions to be displayed to a user.

Figure 14:
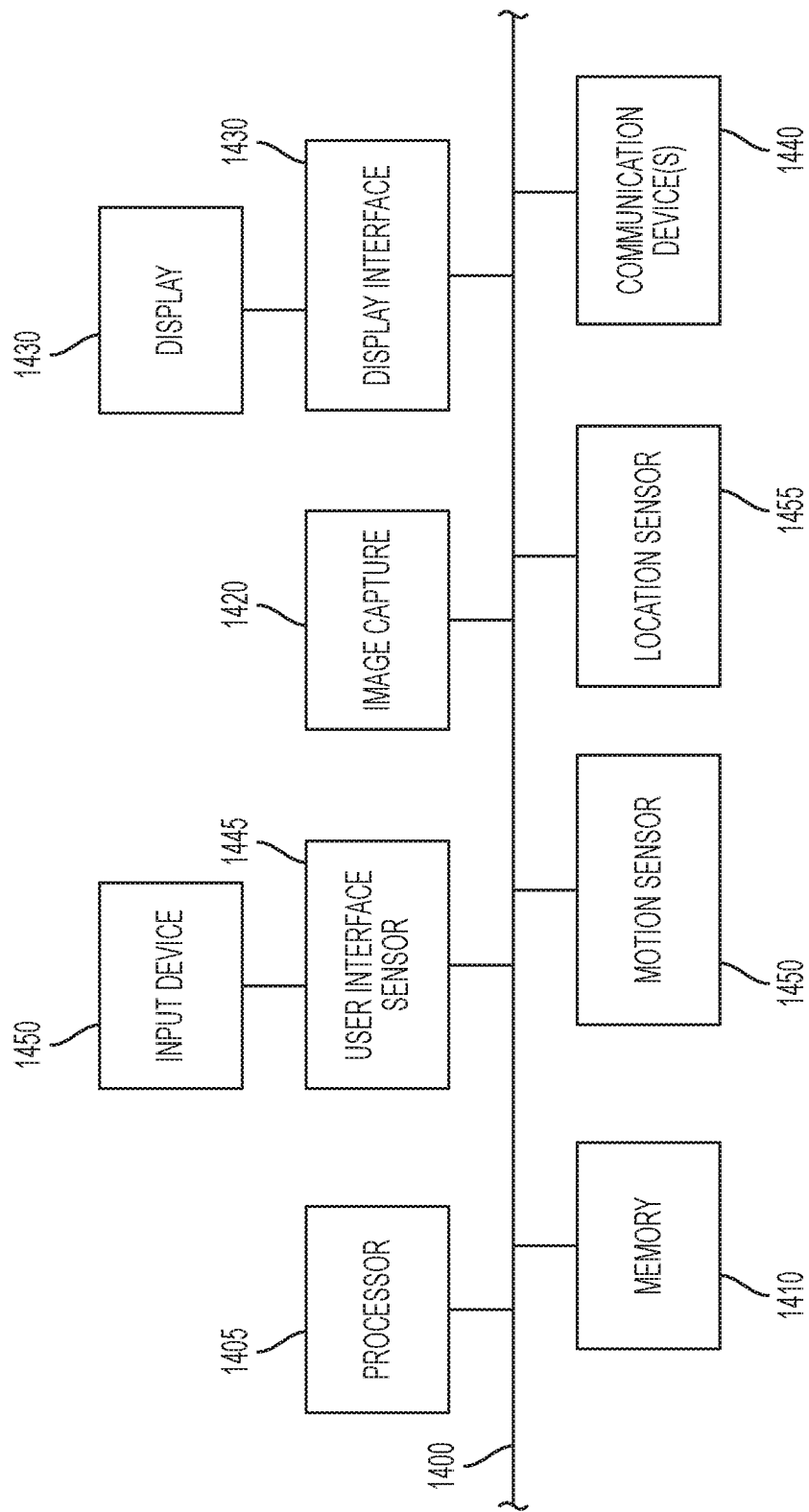
FIG. 14 illustrates a block diagram of example hardware that may be used to contain or implement program instructions according to an embodiment.

FIG. 14 depicts a block diagram of hardware that may be included with various components of the systems described above. A bus 1400 serves as an information path interconnecting at least some other illustrated components of the hardware. Processor 1405 is a central processing device of the system, configured to perform calculations and logic operations required to execute a program. Processor 1405, alone or in conjunction with one or more of the other elements disclosed in FIG. 7, is an example of an electronic device, computing device or processor as such terms are used within this disclosure. Unless specifically stated otherwise, the terms "processor" and "processing device" are intended to refer to embodiments that require a single processing device, as well as to embodiments in which a group of processors collectively perform a function or process.

The system may include one or more memory devices 1410. Read-only memory (ROM) and random access memory (RAM) constitute examples of non-transitory computer-readable storage media. Other examples include firmware, hard drives, flash drives, solid state drives and the like. Programming instructions, data and modules may be included on a single memory device, or distributed across multiple memory devices. This document may interchangeably use the terms "computer-readable memory" "computer-readable storage media," "data storage facility" and "memory device" to refer to hardware that stores programming instructions and/or data. Unless specifically stated otherwise, each such term it is intended to include single-device embodiments, multiple device embodiments in which various data and/or instructions are stored on a set of devices, and embodiments with multiple memory sectors of one or more devices.

A display interface 1430 may permit information to be displayed on a display device 1435 in visual, graphic or alphanumeric format.

Communication with external devices may occur using various communication devices 1440, such as an antenna that can receive and transmit wireless signals, a transmitter and/or receiver, a short-range or near-field communication tag, or a communications port that is configured to accept a network cable for carrying data via electronic signals to one or more external devices. The communication device 1440 may be connected to a communications network, such as the Internet or an intranet.

The hardware may also include a user interface sensor 1445, which includes one or more sensor devices that are configured to receive of data from a user input device 1450 such as a keyboard, keypad, mouse, a joystick, a touch screen, a track pad, a remote control, an external pointing device, a light pen, a video input device and/or an audio input device. Examples of such sensors include keypad and touchscreen sensors.

The hardware may include one or more image capturing devices 1420 that include an image sensor and programming instructions configured to cause the image sensor to capture an image or sequence of images and save the image(s) to a memory device in the form of one or more digital data files.

The hardware also may include one or more motion sensors 1450, each of which is one or more sensing devices configured to capture data corresponding to motion of the device. Examples of motion sensors include gyroscopes or accelerometers.

The hardware also may include one or more location sensors 1455 such as a global positioning system (GPS) receiver that receives positional data from the external GPS network.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system comprising:
    a memory device; and
    an electronic device operatively coupled to the memory device, wherein the electronic device is configured to:
        receive a selection by a user of a geographical location on an electronic map;
        initiate a creation of an electronic invitation in response to the selection of the geographic location on the electronic map, wherein the electronic invitation is associated with event details comprising the selected geographic location;
        present, to the user that selected the geographic location, a unique code that corresponds to the event details comprising the geographic location;
        receive an indication for a recipient of the electronic invitation;
        initiate a transmission of the electronic invitation to the recipient, wherein the electronic invitation comprises the unique code; and
        update the geographic location of the event details after transmission of the electronic invitation, wherein the transmitted electronic invitation is associated with the updated geographic location.

2. The system of claim 1, wherein the electronic device generates the unique code that corresponds to the event details, and wherein the unique code comprises a random alpha-numeric code.

3. The system of claim 1, wherein:
    to receive the indication for the recipient comprises the electronic device to receive user input indicating an email address associated with the recipient; and
    to initiate the transmission of the electronic invitation to the recipient comprises the electronic device to transmit an email message to the email address associated with the recipient, wherein the email message comprises the electronic invitation.

4. The system of claim 1, wherein:
    to receive the indication for the recipient comprises the electronic device to receive user input indicating an identifier associated with a social media account of the recipient; and
    to initiate the transmission of the electronic invitation to the recipient comprises the electronic device to transmit a message to the social media account associated with the recipient, wherein the message comprises the electronic invitation.

5. The system of claim 1, wherein:
    to receive the indication for the recipient comprises the electronic device to receive user input indicating a phone number associated with the recipient; and
    to initiate the transmission of the electronic invitation to the recipient comprises the electronic device to transmit a short message service (SMS) text message to the phone number associated with the recipient, wherein the SMS text message comprises the electronic invitation.

6. The system of claim 1, wherein the electronic device is further to:
    cause a server to store the event details comprising the geographic location and associate the event details with the unique code;
    transmit the electronic invitation, wherein the electronic invitation comprises the unique code and is absent the geographic location; and
    cause the server to associate the unique code with a new geographic location after transmitting the electronic invitation, wherein the transmitted electronic invitation corresponds to the new geographic location.

7. A method comprising:
    receiving, by a processing device, a selection by a user of a geographical location on an electronic map;
    initiating, by the processing device, a creation of an electronic invitation in response to the selection of the geographic location on the electronic map, wherein the electronic invitation is associated with event details comprising the selected geographic location;
    presenting, to the user that selected the geographic location, a unique code that corresponds to the event details comprising the geographic location;
    receiving an indication for a recipient of the electronic invitation;

initiating a transmission of the electronic invitation to the recipient, wherein the electronic invitation comprises the unique code; and updating the geographic location of the event details after transmission of the electronic invitation, wherein the transmitted electronic invitation is associated with the updated geographic location.

8. The method of claim 7, wherein:

receiving the indication for the recipient comprises receiving an email address associated with the recipient; and initiating the transmission of the electronic invitation comprises transmitting an email message to the email address associated with the recipient, wherein the email message comprises the electronic invitation.

9. The method of claim 7, wherein:

receiving the indication for the recipient comprises receiving an identifier associated with a social media account of the recipient; and initiating the transmission of the electronic invitation comprises transmitting a message to the social media account associated with the recipient, wherein the message comprises the electronic invitation.

10. The method of claim 7, wherein:

receiving the indication for the recipient comprises receiving a phone number associated with the recipient; and initiating the transmission of the electronic invitation comprises transmitting a short message service (SMS) text message to the phone number associated with the recipient, wherein the SMS text message comprises the electronic invitation.

11. The method of claim 7, further comprising:

causing a server to store the event details comprising the geographic location and associate the event details with the unique code;

transmitting, by the processing device, the electronic invitation, wherein the electronic invitation comprises the unique code and is absent the geographic location; and causing the server to associate the unique code with a new geographic location after transmitting the electronic invitation, wherein the transmitted electronic invitation corresponds to the new geographic location.

12. A non-transitory computer readable storage medium comprising instructions to cause a processor to:

receive a selection by a user of a geographical location on an electronic map;

initiate a creation of an electronic invitation in response to the selection of the geographic location on the electronic map, wherein the electronic invitation is associated with event details comprising the selected geographic location;

present, to the user that selected the geographic location, a unique code that corresponds to the event details comprising the geographic location;

receive an indication for a recipient of the electronic invitation;

initiate a transmission of the electronic invitation to the recipient, wherein the electronic invitation comprises the unique code; and update the geographic location of the event details after transmission of the electronic invitation, wherein the transmitted electronic invitation is associated with the updated geographic location.

13. The non-transitory computer readable storage medium of claim 12, wherein:

to receive the indication for the recipient comprises the processor to receive an email address associated with the recipient; and to initiate the transmission of the electronic invitation comprises the processor to transmit an email message to the email address associated with the recipient, wherein the email message comprises the electronic invitation.

14. The non-transitory computer readable storage medium of claim 12, wherein:

to receive the indication for the recipient comprises the processor to receive an identifier associated with a social media account of the recipient; and to initiate the transmission of the electronic invitation comprises the processor to transmit a message to the social media account associated with the recipient, wherein the message comprises the electronic invitation.

15. The non-transitory computer readable storage medium of claim 12, wherein:

to receive the indication for the recipient comprises the processor to receive a phone number associated with the recipient; and to initiate the transmission of the electronic invitation comprises the processor to transmit a short message service (SMS) text message to the phone number associated with the recipient, wherein the SMS text message comprises the electronic invitation.

16. The non-transitory computer readable storage medium of claim 12, wherein the processor is further to:

cause a server to store the event details comprising the geographic location and associate the event details with the unique code;

transmit the electronic invitation, wherein the electronic invitation comprises the unique code and is absent the geographic location; and cause the server to associate the unique code with a new geographic location after transmitting the electronic invitation, wherein the transmitted electronic invitation corresponds to the new geographic location.

* * * * *